US 12,427,817 B2

(12) United States Patent
Brinkley et al.

(10) Patent No.: US 12,427,817 B2
(45) Date of Patent: Sep. 30, 2025

(54) VEHICLE WITH ADJUSTABLE HITCH

(71) Applicant: CNH Industrial America LLC, New Holland, PA (US)

(72) Inventors: Jerry L. Brinkley, Woodridge, IL (US); Matthew Klopfenstein, Chenoa, IL (US)

(73) Assignee: CNH Industrial America LLC, New Holland, PA (US)

( * ) Notice: Subject to any disclaimer, the term of this patent is extended or adjusted under 35 U.S.C. 154(b) by 493 days.

(21) Appl. No.: 18/071,135

(22) Filed: Nov. 29, 2022

(65) Prior Publication Data

US 2024/0174035 A1    May 30, 2024

(51) Int. Cl.
*B60D 1/46* (2006.01)
*B60D 1/04* (2006.01)

(52) U.S. Cl.
CPC ........ *B60D 1/46* (2013.01); *B60D 1/04* (2013.01)

(58) Field of Classification Search
CPC ........... B60D 1/46; B60D 1/04; A01B 63/112; A01B 63/10; A01B 63/1006; B62D 13/005; A01D 41/145; F15B 11/08; F15B 11/22
See application file for complete search history.

(56) References Cited

U.S. PATENT DOCUMENTS

| | | | | |
|---|---|---|---|---|
| 4,510,849 A * | 4/1985 | Khramtsov | ............. | F15B 11/22 92/49 |
| 6,053,257 A * | 4/2000 | Sugiyama | ............. | E02F 9/2004 172/465 |
| 6,189,432 B1 * | 2/2001 | Colarelli | ................. | F15B 11/22 91/171 |
| 6,230,817 B1 * | 5/2001 | Haugen | ................ | A01B 59/068 172/7 |
| 6,253,859 B1 * | 7/2001 | Coenen | .............. | A01B 63/1006 91/530 |
| 6,659,192 B2 * | 12/2003 | Coenen | .............. | A01B 63/1006 172/7 |
| 6,662,881 B2 * | 12/2003 | Domann | ............... | E02F 9/2275 172/272 |

(Continued)

FOREIGN PATENT DOCUMENTS

| | | | |
|---|---|---|---|
| DE | 19939967 C2 * | 10/2003 | ......... A01B 63/1006 |
| EP | 1403102 A1 * | 3/2004 | ........... A01B 59/068 |
| GB | 2376403 A * | 12/2002 | ......... A01B 63/1006 |

*Primary Examiner* — James A Shriver, II
(74) *Attorney, Agent, or Firm* — Foley & Lardner LLP

(57) ABSTRACT

A vehicle includes a frame, a hitch coupled to the frame, a cylinder positioned to move the hitch relative to the frame, the cylinder having a first chamber and a second chamber, and a fluid system fluidly coupled to the cylinder. The fluid system includes an action select valve reconfigurable between a single-acting configuration and a double-acting configuration. The fluid system is configured to supply a fluid to the first chamber to raise the hitch. When the action select valve is in the double-acting configuration, the fluid system controls the cylinder to lower the hitch by draining the fluid from the first chamber and supplying the fluid to the second chamber. When the action select valve is in the single-acting configuration, the fluid system controls the cylinder to lower the hitch by draining the fluid from the first chamber without supplying the fluid to the second chamber.

20 Claims, 14 Drawing Sheets

(56) References Cited

U.S. PATENT DOCUMENTS

| | | | | |
|---|---|---|---|---|
| 6,698,523 | B2* | 3/2004 | Barber | F15B 21/082 |
| | | | | 172/4 |
| 6,920,940 | B2* | 7/2005 | Casali | A01B 59/068 |
| | | | | 172/439 |
| 7,669,392 | B2* | 3/2010 | Ehrhart | A01D 34/283 |
| | | | | 56/10.2 E |
| 7,832,520 | B2* | 11/2010 | Murakami | A01B 67/00 |
| | | | | 180/338 |
| 8,160,785 | B2* | 4/2012 | Kahle | E02F 9/2267 |
| | | | | 701/50 |
| 9,026,318 | B2* | 5/2015 | Schedgick | A01B 63/112 |
| | | | | 701/50 |
| 9,357,691 | B2* | 6/2016 | Brockmann | A01B 63/10 |
| 11,246,252 | B2* | 2/2022 | Bhosale | B60D 1/1675 |
| 11,566,640 | B2* | 1/2023 | Nakajima | F15B 11/024 |
| 11,680,386 | B2* | 6/2023 | Fukuda | E02F 9/2271 |
| | | | | 60/431 |
| 11,690,308 | B2* | 7/2023 | Stanhope | A01B 63/002 |
| | | | | 172/1 |
| 2005/0098329 | A1* | 5/2005 | Nordhoff | A01B 63/1006 |
| | | | | 172/439 |
| 2013/0086899 | A1* | 4/2013 | Sefcik | F15B 15/149 |
| | | | | 60/459 |
| 2024/0174035 | A1* | 5/2024 | Brinkley | A01B 63/22 |
| 2024/0175452 | A1* | 5/2024 | Brinkley | F15B 1/08 |

\* cited by examiner

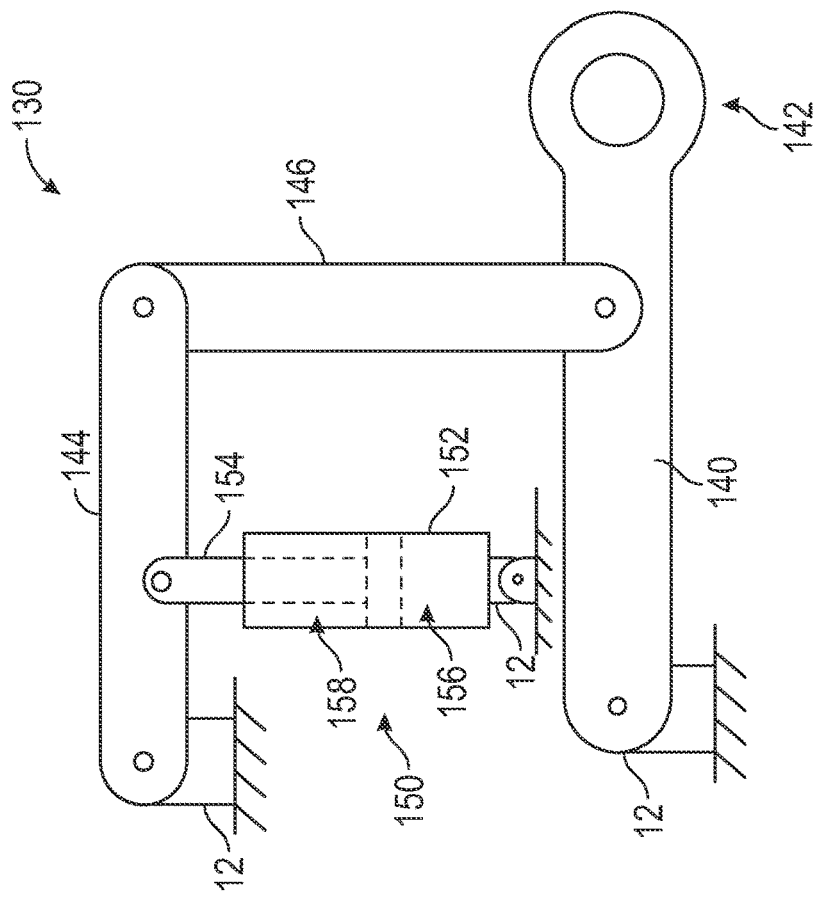
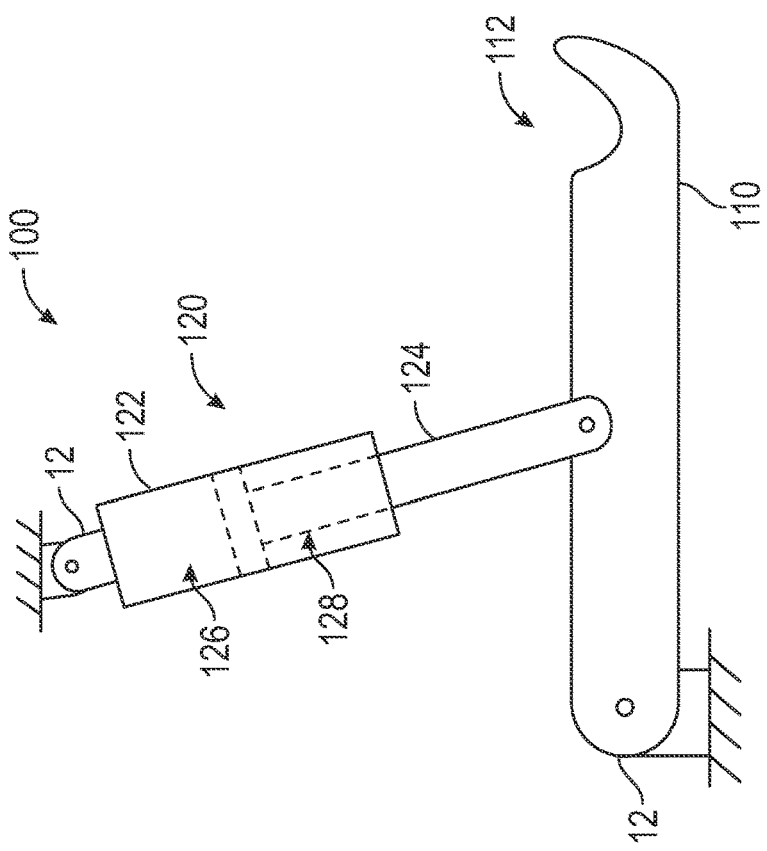
FIG. 5
FIG. 4

VEHICLE WITH ADJUSTABLE HITCH

BACKGROUND

The present disclosure relates generally to vehicles. More specifically, the present disclosure relates to vehicle with hitches that facilitate engaging an attachment (e.g., implement a trailer, etc.).

A vehicle may include a hitch that can be engaged with an attachment to couple the attachment to the vehicle. In some vehicles, a portion of the hitch can be raised or lowered relative to a frame of the vehicle to raise or lower the attachment. This raising and lowering may be controlled by one or more hydraulic cylinders.

SUMMARY

One embodiment relates to a vehicle. The vehicle includes a frame, a hitch coupled to the frame, a cylinder positioned to move the hitch relative to the frame, the cylinder having a first chamber and a second chamber, and a fluid system fluidly coupled to the cylinder. The fluid system includes an action select valve reconfigurable between a single-acting configuration and a double-acting configuration. The fluid system is configured to supply a fluid to the first chamber to raise the hitch. When the action select valve is in the double-acting configuration, the fluid system controls the cylinder to lower the hitch by draining the fluid from the first chamber and supplying the fluid to the second chamber. When the action select valve is in the single-acting configuration, the fluid system controls the cylinder to lower the hitch by draining the fluid from the first chamber without supplying the fluid to the second chamber.

Another embodiment relates to a vehicle. The vehicle includes a frame, a first hitch coupled to a first end of the frame, a first cylinder positioned to move the first hitch relative to the frame, the first cylinder having a first chamber that increases in volume when the first hitch is lowered, a second hitch coupled to a second end of the frame opposite the first end, a second cylinder positioned to move the second hitch relative to the frame, the second cylinder having a second chamber that increases in volume when the second hitch is lowered, and a fluid system fluidly coupled to the first cylinder and the second cylinder. The fluid system includes a first action select valve reconfigurable between (a) a single-acting configuration in which the first action select valve drains a fluid from the first chamber to a low-pressure return while the first hitch is lowered and (b) a double-acting configuration in which the first action select valve supplies the fluid to the first chamber while the first hitch is lowered. The fluid system further includes a second action select valve reconfigurable between (a) a single-acting configuration in which the second action select valve drains the fluid from the second chamber to the low-pressure return while the second hitch is lowered and (b) a double-acting configuration in which the second action select valve supplies the fluid to the second chamber while the second hitch is lowered.

Still another embodiment relates to a vehicle. The vehicle includes a frame, a hitch coupled to the frame, a cylinder positioned to move the hitch relative to the frame, the cylinder having a first chamber and a second chamber, and a fluid system fluidly coupled to the cylinder. The fluid system includes a pressure supply, a low-pressure return, an action select valve including a port, and a mode valve reconfigurable between a raise configuration and a lower configuration. In a double-acting configuration, the action select valve fluidly couples the second chamber to the port. In a single-acting configuration, the action select valve fluidly couples the second chamber to the low-pressure return. In the raise configuration, the mode valve (a) fluidly couples the pressure supply to the port and (b) fluidly couples the first chamber to the low-pressure return. In the lower configuration, the mode valve (a) fluidly couples the port to the low-pressure return and (b) fluidly couples the pressure supply to the first chamber.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 4 is a side view of a front hitch of the vehicle of FIG. 1, according to an exemplary embodiment.

FIG. 5 is a side view of a rear hitch of the vehicle of FIG. 1, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a hitch that is raised and lowered by pair of cylinders. The hitch may be a front hitch or a rear hitch of the vehicle. Each cylinder includes a first chamber that expands when the hitch is raised and a second chamber that expands when the hitch is lowered. In a single-acting configuration, the second chambers are fluidly coupled to a low-pressure return, and the hitch is moved downward solely by external forces (e.g., gravity). In a double-acting configuration, the second chambers are fluidly coupled to a supply of pressurized hydraulic fluid, and the cylinders positively apply a downward force on the hitch. This system provides an operator of the vehicle with additional flexibility relative to other systems. When a downward force is desired (e.g., an implement attached to the hitch benefits from additional downward force), the operator may select a double-acting mode of operation. When the downward force is not required, the operator may select the single-acting mode of operation to improve the efficiency of the system.

Overall Vehicle

Figure 1:
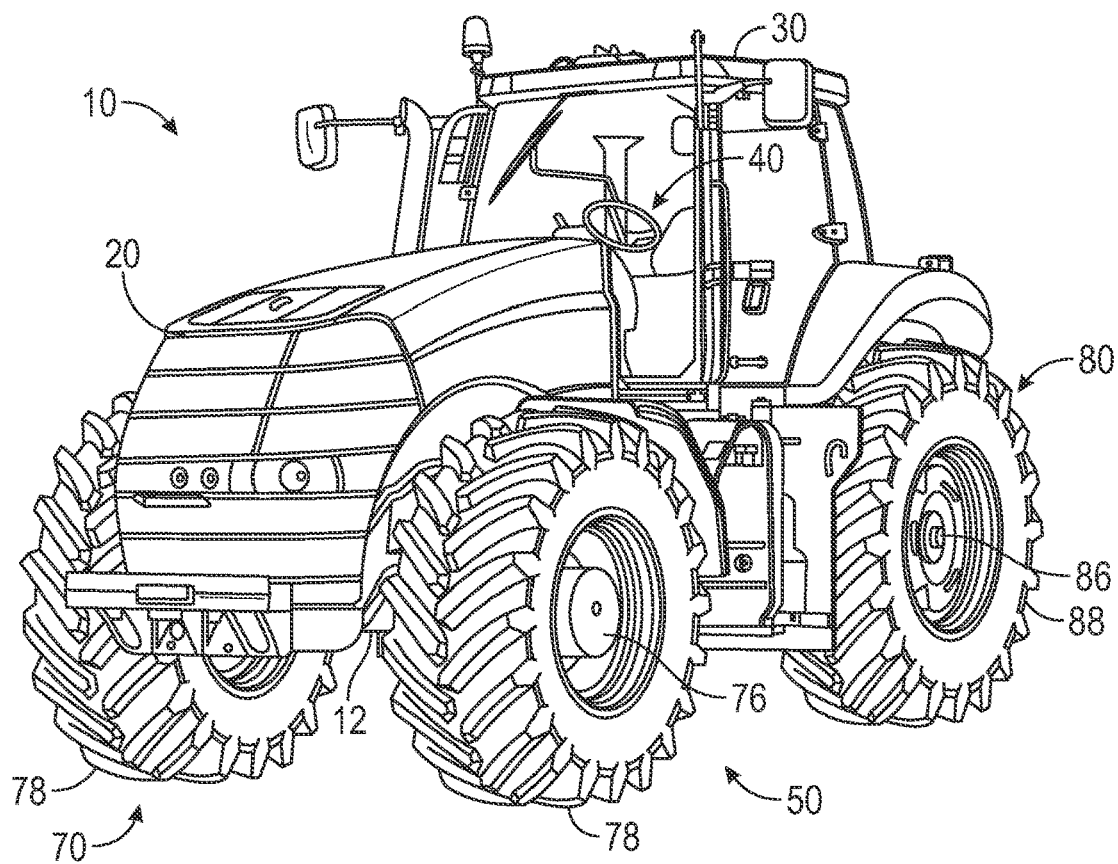
FIG. 1 is a perspective view of a vehicle, according to an exemplary embodiment.
Figure 2:
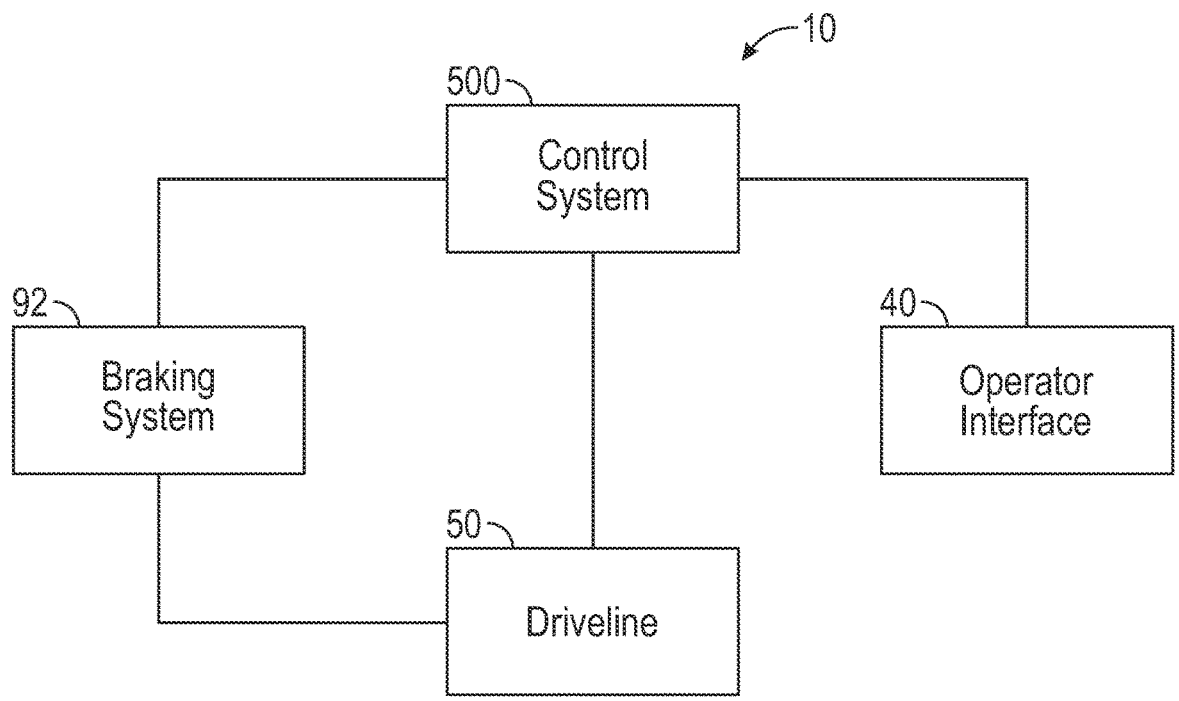
FIG. 2 is a schematic block diagram of the vehicle of FIG. 1, according to an exemplary embodiment.
Figure 3:
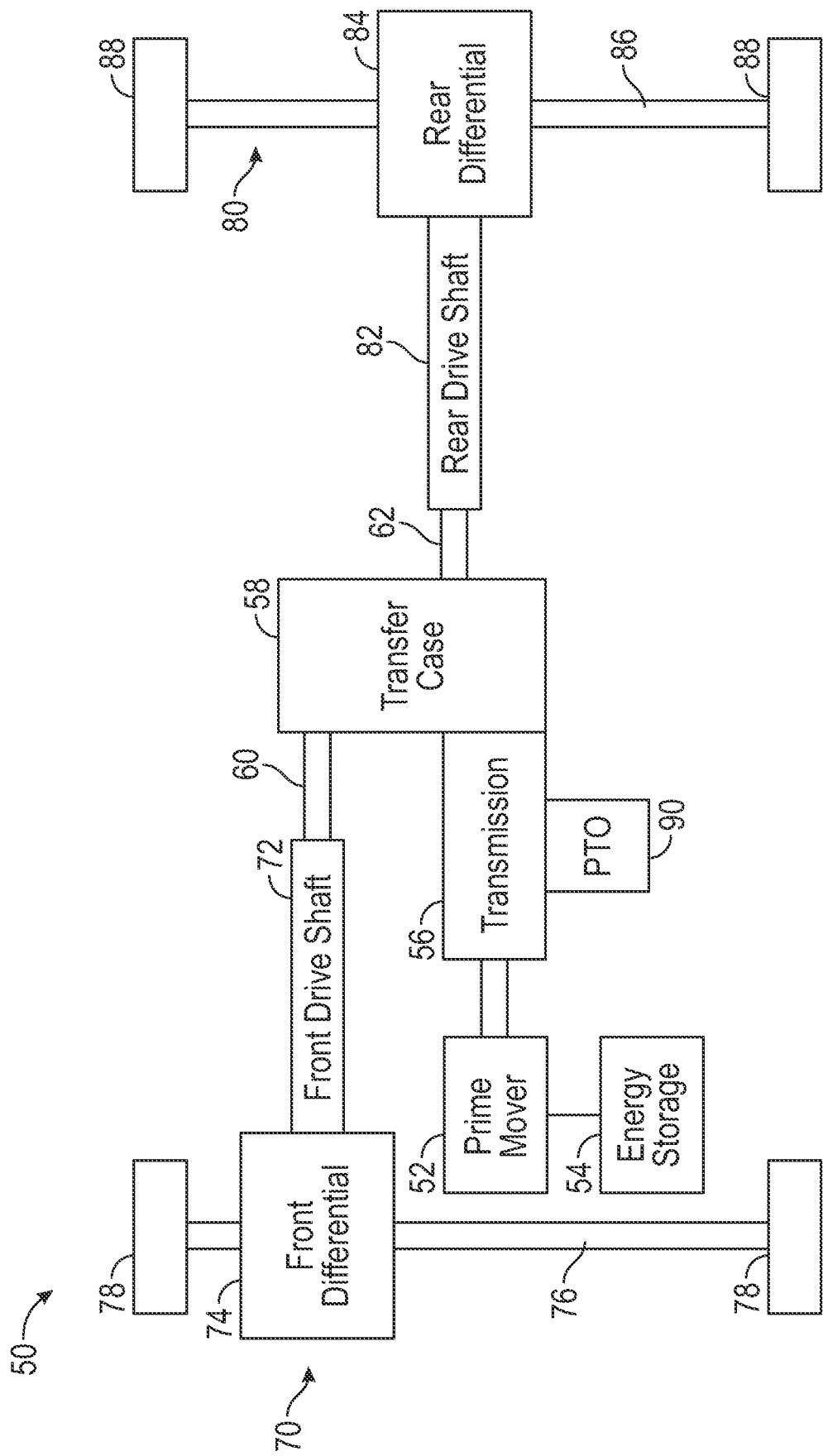
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 500, coupled to the operator interface 40, the driveline 50, and the braking system 92. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Front Hitch

Referring to FIG. 4, the vehicle 10 includes a lift assembly or adjustable hitch assembly, shown as front hitch 100. The front hitch 100 may be positioned at a front end of the frame 12 and coupled to the front end of the frame 12. The front hitch 100 may selectively couple an attachment to the front end of the vehicle 10.

The front hitch 100 includes a first link or member, shown as hitch link 110, that is pivotally coupled to the frame 12 at a first end, such that the hitch link 110 is rotatable about a substantially horizontal axis. An opposing end of the hitch link 110 includes an interface, shown as hook 112, that opens upward. The hook 112 is configured to selectively couple the front hitch 100 to an attachment. By way of example, the hook 112 may selectively couple to an implement (e.g., a snow blower, a mower, a plow, a sweeper, etc.). The attachment may be powered by the PTO 90.

The front hitch 100 further includes an actuator (e.g., a linear actuator, a hydraulic cylinder, etc.), shown as front hitch cylinder 120. The front hitch cylinder 120 includes a first portion, shown as body 122, slidably coupled to a second portion, shown as rod 124. The body 122 is pivotally coupled to the frame 12. The rod 124 is pivotally coupled to the hitch link 110 between the first and second ends.

The body 122 and the rod 124 collectively define a first chamber, shown as cap chamber 126, and a second chamber, shown as rod chamber 128, separated by a piston. When the rod 124 extends out of the body 122, the cap chamber 126 increases in volume, the rod chamber 128 decreases in volume, and the length of the front hitch cylinder 120 increases. Accordingly, the front hitch cylinder 120 lowers the hitch link 110, thereby lowering the hook 112 and any engaged attachments. When the rod 124 retracts into the body 122, the cap chamber 126 decreases in volume, the rod chamber 128 increases in volume, and the length of the front hitch cylinder 120 decreases. Accordingly, the front hitch cylinder 120 raises the hitch link 110, thereby raising the hook 112 and any engaged attachments.

In a single-acting configuration, fluid (e.g., hydraulic oil) is added to the rod chamber 128 to raise the hitch link 110. To lower the hitch link 110, fluid is released from the rod chamber 128, and gravity acts on the hitch link 110 and/or the corresponding attachment to lower the hitch link 110. In a double-acting configuration, fluid is added to the rod chamber 128 to raise the hitch link 110, and fluid is drained from the cap chamber 126. To lower the hitch link 110, fluid is released from the rod chamber 128, and fluid is added to the cap chamber 126 to lower the hitch link 110. Accordingly, in a double-acting configuration, the front hitch cylinder 120 applies a positive force to force the hitch link 110 downward.

Although the front hitch 100 is shown as including one front hitch cylinder 120 and one hitch link 110, the front hitch 100 may include multiple of these components. By way of example, the front hitch 100 may include two front hitch cylinders 120 and two hitch links 110. The hitch links 110 may be fixedly coupled to one another to limit relative movement of the hitch links 110. Additionally, the front hitch cylinders 120 may be fluidly coupled to one another to facilitate simultaneous and similar operation of both front hitch cylinders 120.

Rear Hitch

Referring to FIG. 5, the vehicle 10 includes a lift assembly or adjustable hitch assembly, shown as rear hitch 130. The rear hitch 130 may be positioned at a rear end of the frame 12 and coupled to the rear end of the frame 12. The rear hitch 130 may selectively couple an attachment to the rear end of the vehicle 10.

The rear hitch 130 includes a first link or member, shown as hitch link 140, that is pivotally coupled to the frame 12 at a first end, such that the hitch link 140 is rotatable about a substantially horizontal axis. An opposing end of the hitch link 140 includes an interface, shown as socket 142, that is enclosed along the top and bottom sides. The socket 142 is configured to selectively couple the rear hitch 130 to an attachment. By way of example, the socket 142 may selectively couple to an implement (e.g., a mower, blade, a rotary cutter, a rake, a backhoe, a tiller, etc.). The attachment may be powered by the PTO 90.

The rear hitch 130 further includes a second link or member, shown as actuator link 144, that is pivotally coupled to the frame 12 at a first end, such that the actuator link 144 is rotatable about a substantially horizontal axis. An opposing end of the actuator link 144 is pivotally coupled to a first end of a third link or member, shown as connecting link 146. An opposing end of the connecting link 146 is coupled to the hitch link 140. The hitch link 140, the actuator link 144, and the connecting link 146 form a four bar linkage, such that the hitch link 140, the actuator link 144, and the connecting link 146 all move together. By way of example, when the actuator link 144 moves upward, the connecting link 146 causes a corresponding upward motion of the hitch link 140.

The rear hitch 130 further includes an actuator (e.g., a linear actuator, a hydraulic cylinder, etc.), shown as rear hitch cylinder 150. The rear hitch cylinder 150 includes a first portion, shown as body 152, slidably coupled to a second portion, shown as rod 154. The body 152 is pivotally coupled to the frame 12. The rod 154 is pivotally coupled to the actuator link 144 between the first and second ends.

The body 152 and the rod 154 collectively define a first chamber, shown as cap chamber 156, and a second chamber, shown as rod chamber 158, separated by a piston. When the rod 154 extends out of the body 152, the cap chamber 156 increases in volume, the rod chamber 158 decreases in volume, and the length of the rear hitch cylinder 150 increases. Accordingly, the rear hitch cylinder 150 raises the actuator link 144, which causes a corresponding upward movement of the hitch link 140, thereby raising the socket 142 and any engaged attachments. When the rod 154 retracts into the body 152, the cap chamber 156 decreases in volume, the rod chamber 158 increases in volume, and the length of the rear hitch cylinder 150 decreases. Accordingly, the rear hitch cylinder 150 lowers the actuator link 144, which causes a corresponding downward movement of the hitch link 140, thereby lowering the socket 142 and any engaged attachments.

In a single-acting configuration, fluid (e.g., hydraulic oil) is added to the cap chamber 156 to raise the hitch link 140. To lower the hitch link 140, fluid is released from the cap chamber 156, and gravity acts on the hitch link 140 and/or the corresponding attachment to lower the hitch link 140. In a double-acting configuration, fluid is added to the cap chamber 156 to raise the hitch link 140, and fluid is drained from the rod chamber 158. To lower the hitch link 140, fluid is released from the cap chamber 156, and fluid is added to the rod chamber 158 to lower the hitch link 140. Accordingly, in a double-acting configuration, the rear hitch cylinder 150 applies a positive force to force the hitch link 140 downward.

Although the rear hitch 130 is shown as including one rear hitch cylinder 150 and one hitch link 140, the rear hitch 130 may include multiple of these components. By way of example, the rear hitch 130 may include two rear hitch cylinders 150 and two hitch links 140. The hitch links 140 may be fixedly coupled to one another to limit relative movement of the hitch links 140. Additionally, the rear hitch cylinders 150 may be fluidly coupled to one another to facilitate simultaneous and similar operation of both rear hitch cylinders 150.

Front Hitch—Hydraulic System

Figure 6:
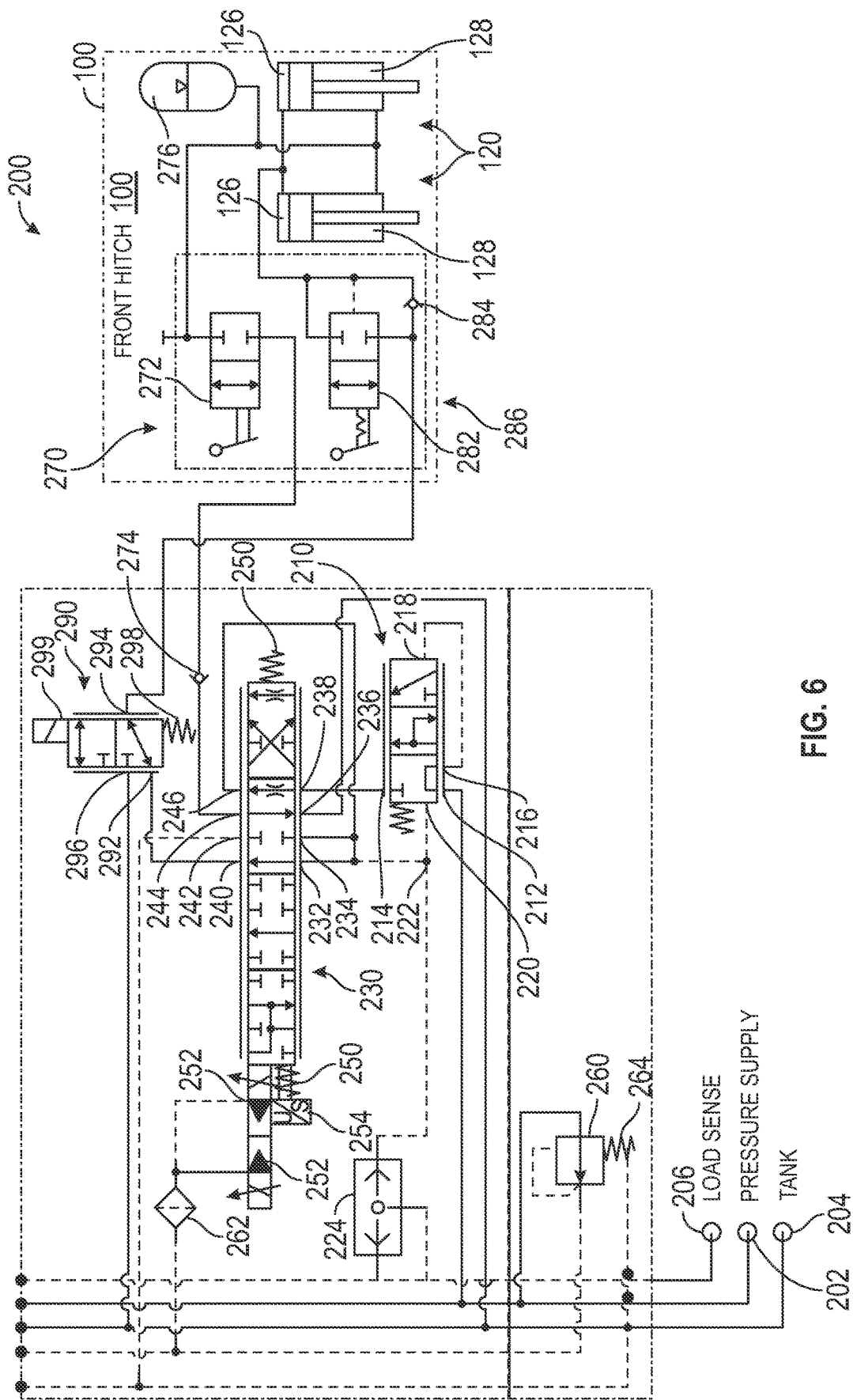
FIG. 6 is a schematic of a hydraulic circuit for controlling the front hitch of FIG. 4, according to an exemplary embodiment.

Referring to FIG. 6, the vehicle 10 includes a fluid power system for the front hitch 100, shown as hydraulic circuit 200. The hydraulic circuit 200 controls the flow of hydraulic fluid to and from a pair of front hitch cylinders 120 to control raising and lowering of the front hitch 100. Advantageously, the hydraulic circuit 200 may be selectively reconfigurable between a single-acting configuration and a double-acting configuration of the front hitch 100. In the double-acting configuration, the hydraulic circuit 200 permits applying a positive downward force with the front hitch 100. This may be advantageous when operating certain types of implements, such as plows, sweepers, or snow blowers, that benefit from a downward force (e.g., to more effectively engage the attachment with the ground). In a single-acting configuration, the front hitch 100 may rely on gravity to move the attachment downward, but operation of the hydraulic circuit 200 may be more energy efficient (e.g., the hydraulic circuit 200 may require less energy to perform a given task). Accordingly, by permitting an operator to select between single-acting and double-acting operation, the hydraulic circuit 200 may permit efficiency and flexibility in operating the vehicle 10.

The hydraulic circuit 200 includes a supply of pressurized hydraulic fluid, shown as pressure supply 202. In some embodiments, the pressure supply 202 is an outlet of a pump or system of pumps (e.g., the pump 510). The hydraulic circuit 200 includes a low-pressure return or reservoir, shown as tank 204. The tank 204 may be fluidly coupled to the pump, such that the pump pressurizes hydraulic fluid from the tank 204 to provide the pressure supply 202. The hydraulic circuit 200 further includes a sensing output, shown as load sense 206, that is provided to another system of the vehicle 10. In some embodiments, the pump that provides the pressure supply 202 is a load sense pump that is controlled based on the pressure returned by the load sense 206.

The hydraulic circuit 200 includes a directional control valve, shown as pressure control valve 210. The pressure control valve 210 is a three position, proportional directional control valve. The pressure control valve 210 includes a first port, shown as supply port 212, a second port, shown as outlet port 214, and a third port, shown as sensing port 216. The supply port 212 is fluidly coupled to the pressure supply 202. The outlet port 214 acts as an output of the pressure control valve 210. The sensing port 216 provides pressure feedback that controls the pressure control valve 210.

In a first, end position (i.e., the leftmost position shown in FIG. 6), the supply port 212 is fluidly coupled to the sensing port 216, and the outlet port 214 is plugged. In a second, middle position (i.e., the middle position shown in FIG. 6), the supply port 212 is fluidly coupled to both the outlet port 214 and the sensing port 216. In a third, end position (i.e., the rightmost position shown in FIG. 6), the supply port 212 is plugged, and the sensing port 216 is fluidly coupled to the outlet port 214.

A spool of the pressure control valve 210 is biased to the first position by a spring. Accordingly, the pressure control valve 210 is normally in the first position if no pressure is applied. The sensing port 216 is fluidly coupled to a first end 218 of the pressure control valve 210 through a flow-restricting orifice. Accordingly, as the pressure at the sensing port 216 increases, hydraulic fluid applies a force on the first end 218 to move the spool toward the third position. A second end 220 of the pressure control valve 210 is fluidly coupled to load sense line, shown as common node 222, of the hydraulic circuit 200. Accordingly, as the pressure at the common node 222 increases, hydraulic fluid applies a force on the second end 220 to move the spool toward the first position.

In operation, the pressure control valve 210 is biased into the first position (i.e., in a closing direction) by the spring. In the first position, as pressure is applied at the supply port 212, the pressure control valve 210 directs the pressure to the first end 218, which moves the spool toward the third position (i.e., in an opening direction). As the spool moves from the first position to the second position, flow is directed from the supply port 212 to the outlet port 214. If the pressure at the first end 218 continues to increase, and the spool moves from the second position toward the third position, the flow from the supply port 212 to the outlet port 214 is constricted, and the pressure at the first end 218 is vented to the outlet port 214. Accordingly, the pressure control valve 210 regulates the flow through the pressure control valve 210 and the pressure at the outlet port 214. The pressure at the common node 222 is applied at the second end 220 and biases the spool toward the third position.

The common node 222 is fluidly coupled to the load sense 206 through a valve, shown as shuttle valve 224. The shuttle valve 224 has a first port that is fluidly coupled to the common node 222 and a second port opposite the first port. The shuttle valve 224 fluidly couples the load sense 206 to whichever of the first port and the second port has the greater pressure. The shuttle valve 224 may be used to compare two hydraulic pressures within the vehicle 10 and provide the larger of the two to the load sense 206. Additional shuttle valves may facilitate comparisons to other pressures within the vehicle 10.

Referring to FIGS. 6-10, the hydraulic circuit 200 includes a directional control valve, shown as mode valve 230. The mode valve 230 controls an operating mode of the hydraulic circuit 200. As shown, the mode valve 230 is a four position, proportional directional control valve, such that a spool of the mode valve 230 is repositionable between four positions. Each position of the mode valve 230 corresponds to a different operating mode of the hydraulic circuit 200. Specifically, the mode valve 230 has positions corresponding to a float mode, a neutral mode, a raise mode, and a lower mode. The position of the spool may be controlled to select a desired mode of operation of the hydraulic circuit 200.

The mode valve 230 has eight total ports, four of which are positioned along a first side of the mode valve 230. A first port, shown as common port 232, and a second port, shown as common port 234, are both fluidly coupled to the common node 222. A third port, shown as tank port 236, is fluidly coupled to the tank 204. Accordingly, the tank port 236 provides a low-pressure sink to drain fluid from mode valve 230. A fourth port, shown as supply port 238, is fluidly coupled to the outlet port 214. Accordingly, the supply port 238 provides a supply of hydraulic fluid to the mode valve 230, the pressure of which is regulated by the pressure control valve 210.

Four additional ports are positioned along a second side of the mode valve 230. A fifth port, shown as lower port 240, is positioned to direct fluid to and from the cap chambers 126 of the front hitch cylinder 120. In a double-acting mode of operation, the lower port 240 can direct fluid to the cap chambers 126 to lower the front hitch 100. A sixth port, shown as tank port 242, is fluidly coupled to the tank 204. Accordingly, the tank port 242 provides a low-pressure sink to drain fluid from mode valve 230. A seventh port, shown as raise port 244, is positioned to direct fluid to and from the rod chambers 128 of the front hitch cylinder 120. In both the single-acting and double-acting modes of operation, the raise port 244 can direct fluid to the rod chambers 128 to raise the front hitch 100. An eighth port, shown as common port 246, is fluidly coupled to the common node 222. Accordingly, the common ports 232, 234, and 246 are all fluidly coupled to one another.

The mode valve 230 includes a pair of springs 250 that bias the spool of the mode valve 230 in opposite directions. The mode valve 230 further includes a pair of externally-piloted solenoids, shown as solenoids 252. The solenoids 252 are oriented in opposing directions, such that each solenoid 252 actuates the spool in a different direction. The solenoids 252 can be actuated independently to cause the spool to move to a desired position. The solenoids 252 can be activated or deactivated simultaneously to hold the spool in place. The mode valve 230 further includes a position sensor, shown as linear variable differential transformer (LVDT) 254, coupled to the spool of the mode valve 230. The LVDT 254 provides position data indicating a current position of the spool. The LVDT 254 may be used to provide closed-loop control over the position of the spool.

Referring to FIG. 6, the hydraulic circuit 200 includes a pressure reducing valve, shown as reducing valve 260 having an upstream side that is fluidly coupled to the pressure supply 202. The reducing valve 260 has a downstream side that is fluidly coupled to the solenoids 252 through a filter 262. The reducing valve 260 is a normally open valve and is biased to an open position by a spring 264. In the open position, the reducing valve 260 fluidly couples the pressure supply 202 to the solenoids 252 to provide pilot pressure for operating the solenoids 252. The reducing valve 260 is biased to a closed position by the pressure immediately downstream of the reducing valve 260. In the closed position, the reducing valve 260 fluidly decouples the pressure supply 202 from the solenoids 252. Accordingly, the reducing valve 260 closes if the downstream pressure is higher than a threshold pressure. The reducing valve 260 maintains the pressure received by the solenoids 252 at or below the threshold pressure (e.g., a target operating pressure for the solenoids 252).

The hydraulic circuit 200 further includes a first section, shown as raise circuit 270, that is fluidly coupled to the mode valve 230. The raise circuit 270 controls raising of the front hitch 100. The raise circuit 270 includes a first directional control valve, shown as raise control valve 272, that is fluidly coupled to the raise port 244. As shown, the raise control valve 272 is fluidly coupled to the raise port 244 through a check valve 274 that limits (e.g., prevents) flow from the raise control valve 272 to the raise port 244. In other embodiments, the check valve 274 is omitted. The raise control valve 272 is fluidly coupled to the rod chambers 128 of the front hitch cylinders 120.

The raise control valve 272 includes a spool that is repositionable between a first, closed position (i.e., the rightmost position shown in FIG. 6) and a second, open position (i.e., the leftmost position shown in FIG. 6). When in the closed position, the spool prevents flow between (e.g., fluidly decouples) the raise port 244 and the rod chambers 128. In the open position, the raise control valve 272 fluidly couples the raise port 244 with the rod chambers 128. The raise control valve 272 is manually operated (e.g., by a lever within the cab 30) to move the spool between the closed position and the open position. Accordingly, the raise control valve 272 may be manually operated to control the flow between the raise port 244 and the rod chambers 128.

The raise circuit 270 further includes a reservoir, shown as accumulator 276. As shown, the accumulator 276 is a gas-charged accumulator that is charged with a pressurized gas (e.g., an inert gas, such as nitrogen). The accumulator 276 includes a bladder that separates the pressurized gas from the hydraulic fluid of the raise circuit 270 and that communicates the pressure of the gas to the hydraulic fluid. In other embodiments, the accumulator 276 is another type of accumulator, such as a spring-biased accumulator or a gravity-biased accumulator. In some embodiments, the accumulator 276 has approximately a 1.4 L capacity.

The accumulator 276 acts as a spring, permitting movement of the front hitch cylinders 120 when a load is applied to the front hitch 100. By way of example, when a downward force is applied on the front hitch 100, the rods 124 may be forced downward, forcing fluid out of the rod chambers 128. This fluid may be received by the accumulator 276 to permit movement of the front hitch cylinders 120 and prevent damage to the vehicle 10 that might otherwise be caused if the fluid were held within the rod chambers 128. The pressurized gas of the accumulator 276 may apply a biasing force that resists downward movement of the front hitch 100.

The hydraulic circuit 200 further includes a second section, shown as lower circuit 280, that is fluidly coupled to the mode valve 230. The lower circuit 280 controls lowering of the front hitch 100. The lower circuit 280 includes a first directional control valve, shown as lower control valve 282, that is fluidly coupled to the lower port 240 (e.g., indirectly through the action select valve 290).

The lower control valve 282 includes a spool that is repositionable between a first, closed position (i.e., the rightmost position shown in FIG. 6) and a second, open position (i.e., the leftmost position shown in FIG. 6). When in the closed position, the spool prevents flow between (e.g., fluidly decouples) the lower port 240 and the cap chambers 126. In the open position, the lower control valve 282 fluidly couples the lower port 240 with the cap chambers 126. The lower control valve 282 is manually operated (e.g., by a lever within the cab 30) to move the spool between the closed position and the open position. Accordingly, the lower control valve 282 may be manually operated to control the flow between the lower port 240 and the cap chambers 126. The lower control valve 282 may include detents that hold the spool in the open position or the closed position, as selected by the operator. The lower control valve 282 is biased into the closed position by the pressure downstream of the lower control valve 282 (e.g., the pressure in the cap chambers 126).

The lower circuit 280 further includes a check valve 284. The check valve 284 is fluidly coupled in parallel with the lower control valve 282. The check valve is oriented to prevent flow through the check valve 284 and into the cap chambers 126. The check valve 284 is positioned to permit flow out of the cap chambers 126 to bypass the lower control valve 282. Accordingly, the check valve 284 permits the front hitch 100 to be raised, even when the lower control valve 282 is in the closed position, by permitting flow from the cap chambers 126 to bypass the lower control valve 282.

The hydraulic circuit 200 includes a directional control valve or action control valve, shown as action select valve 290. The action select valve 290 is positioned to permit selection between single-acting and double-acting operation of the hydraulic circuit 200. The action select valve 290 includes a first port (e.g., an input/output port), shown as inlet 292, that is fluidly coupled to the lower port 240. The action select valve 290 includes a second port (e.g., an input/output port), shown as outlet 294, that is fluidly coupled to the lower control valve 282. The action select valve 290 includes a third port, shown as tank port 296, that is fluidly coupled to the tank 204. Although the inlet 292 and the outlet 294 are referred to as an inlet and an outlet, respectively, it should be understood that the inlet 292 and the outlet 294 may each switch between acting as an inlet (e.g., where fluid flows into the action select valve 290 through the port) and an outlet (e.g., where fluid flows out of the action select valve 290 through the port), depending upon the operating conditions of the hydraulic circuit 200.

The action select valve 290 includes a spool that is repositionable between a first position or double-acting position (i.e., the lowermost position shown in FIG. 6) and a second position or single-acting position (i.e., the uppermost position shown in FIG. 6). In the double-acting position, the action select valve 290 fluidly couples the inlet 292 to the outlet 294 and plugs the tank port 296. In the single-acting position, the action select valve 290 fluidly couples the outlet 294 to the tank port 296 and plugs the inlet 292.

The action select valve 290 is a proportional solenoid valve. The action select valve 290 includes a spring 298 that biases the spool toward the double-acting position. Accordingly, the action select valve 290 is normally in the double-acting position. The action select valve 290 further includes a solenoid 299 that opposes the spring 298. When activated, the solenoid 299 overcomes the force of the spring 298 and moves the spool into the single-acting position.

The operating mode of the hydraulic circuit 200 can be selected by controlling the positions of the mode valve 230, the raise control valve 272, the lower control valve 282, and the action select valve 290. The mode valve 230 selects the primary flow directions of fluid throughout the hydraulic circuit 200. The raise control valve 272 selects whether or not fluid is permitted to pass between the mode valve 230 and the rod chambers 128. The lower control valve 282 selects whether or not fluid is permitted to pass from the mode valve 230 to the cap chambers 126. The action select valve 290 selects whether the front hitch cylinders 120 are controlled in a single-acting configuration or a double-acting configuration. Table 1 below illustrates various operating modes of the hydraulic circuit 200. Although five operating modes are shown, each mode shown may have a single-acting configuration and a double-acting configuration. Accordingly, Table 1 may represent ten different operating modes. In other embodiments, the hydraulic circuit 200 has more or fewer potential operating modes.

TABLE 1

| Operating Mode | Mode Valve 230 | Raise Control Valve 272 | Lower Control Valve 282 |
| --- | --- | --- | --- |
| Float Mode | Position 1 (FIG. 7) | Open | Open |
| Hitch Free Neutral Mode | Position 2 (FIG. 8) | Open | Open |
| Hitch Locked Neutral Mode | Position 2 (FIG. 8) | Closed | Closed |
| Lower Mode | Position 3 (FIG. 9) | Open | Open |
| Raise Mode | Position 4 (FIG. 10) | Open | Open |

Figure 7:
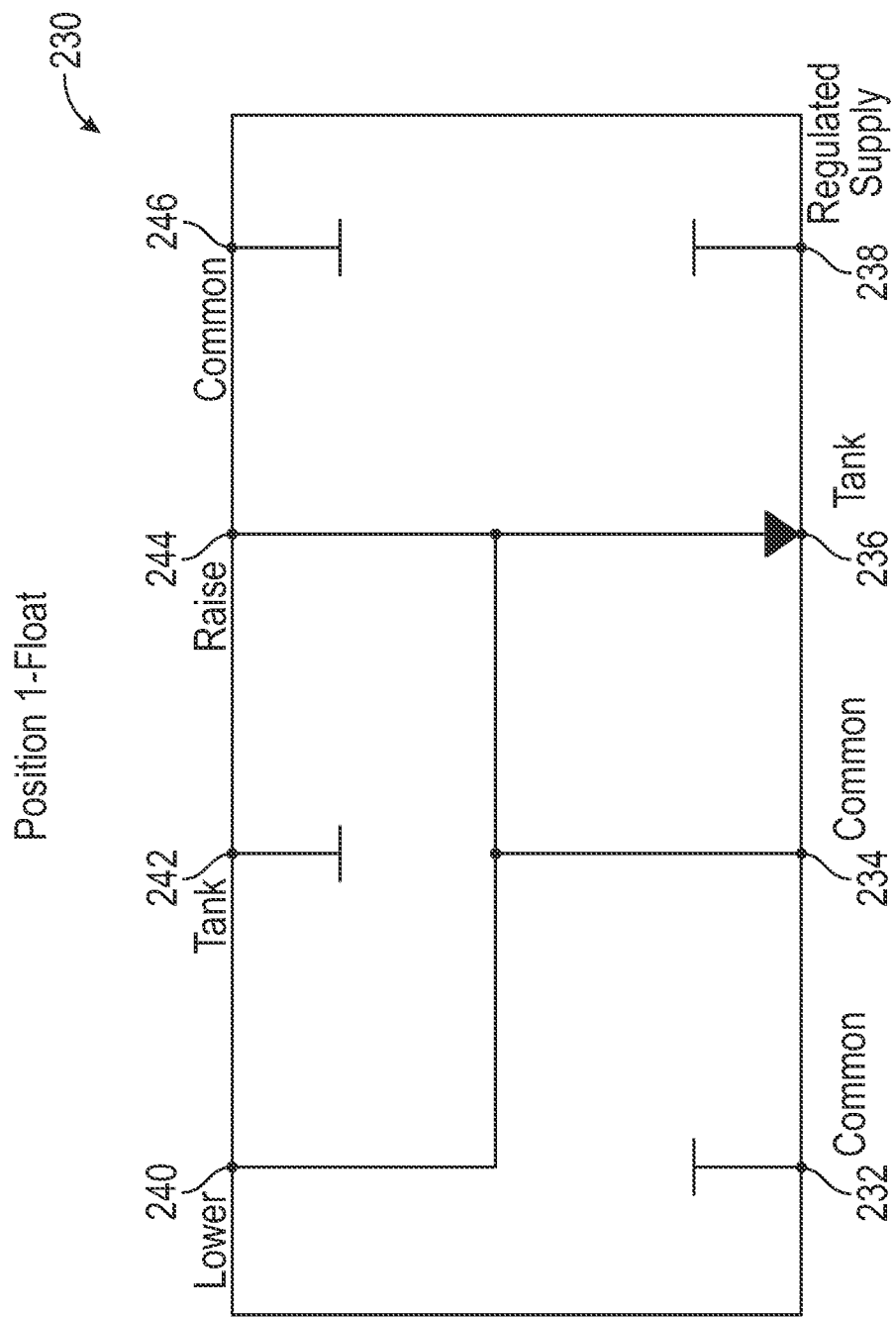
FIG. 7 is a schematic of a mode valve of the hydraulic circuit of FIG. 6 in a float configuration, according to an exemplary embodiment.

Referring to FIGS. 6 and 7, in a float mode, the hydraulic circuit 200 permits the front hitch 100 to move freely (e.g., to a position desired by an operator, to a position driven by gravity, etc.). In the float mode, the mode valve 230 is in the first position (i.e., the leftmost position shown in FIG. 6), and the raise control valve 272 and the lower control valve 282 are in the respective open positions. In the first position of the mode valve 230, the common port 232, the supply port 238, the tank port 242, and the common port 246 are plugged. The common port 234, the lower port 240, and the raise port 244 are all fluidly coupled to the tank port 236. If the action select valve 290 is in the double-acting configuration, fluid from the common node 222, the raise circuit 270, and the lower circuit 280 can be freely exchanged with one another or drained to the tank 204, permitting the front hitch 100 to move freely (e.g., to a position desired by an operator, to a position driven by gravity, etc.). If the action select valve 290 is in the single-acting configuration, fluid from the common node 222 and the raise circuit 270 can be freely exchanged with one another or drained to the tank 204, and the fluid from the lower circuit 280 can be freely drained to the tank 204 (e.g., through the action select valve 290). In the float mode, fluid within the accumulator 276 may be ejected to the tank 204.

Figure 8:
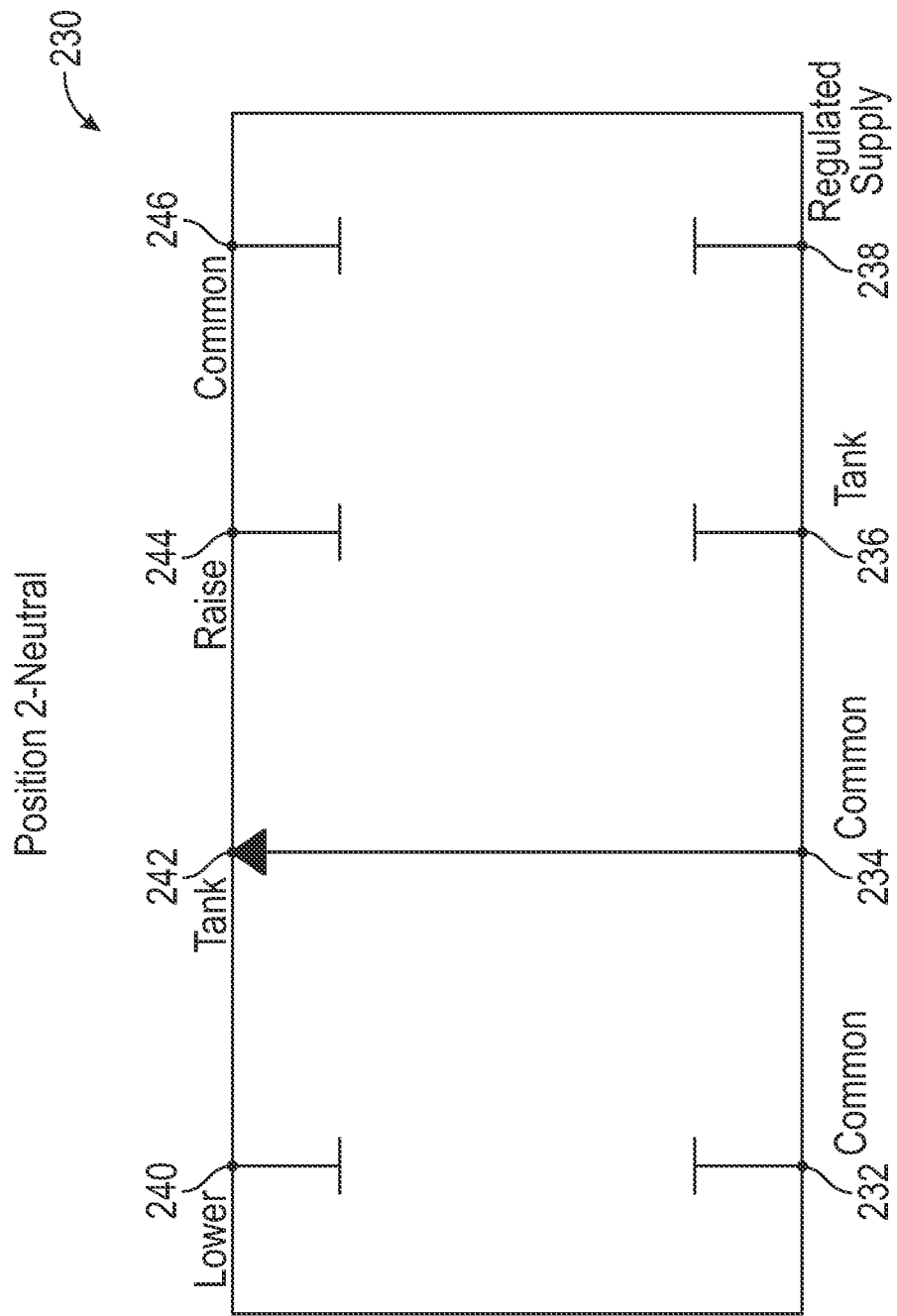
FIG. 8 is a schematic of the mode valve of FIG. 7 in a neutral configuration, according to an exemplary embodiment.

Referring to FIGS. 6 and 8, in the hitch free neutral mode, the raise circuit 270 and the lower circuit 280 are isolated, and the front hitch 100 is permitted to move under the bias of the accumulator 276. In the hitch free neutral mode, the mode valve 230 is in the second position (i.e., the position second from the left as shown in FIG. 6), and the raise control valve 272 and the lower control valve 282 are in the respective open positions. In the second position of the mode valve 230, the common port 232, the tank port 236, the supply port 238, the lower port 240, the raise port 244, and the common port 246 are plugged. The common port 234 is fluidly coupled to the tank port 236. The common node 222 is permitted to flow to the tank 204. As the raise port 244 is plugged, the raise circuit 270 is isolated. In this isolated condition, the accumulator 276 facilitates movement of the front hitch 100. The pressurized gas within the accumulator 276 applies an upward biasing force on the front hitch 100 that encourages upward movement. If the biasing force is overcome, hydraulic fluid is forced into the accumulator 276 and the front hitch 100 can move downwards. If the action select valve 290 is in the single-acting configuration, the lower circuit 280 is drained and permits free movement of the front hitch 100.

In the hitch locked neutral mode, the front hitch 100 is held in place at a fixed position. The control scheme of the hitch locked neutral mode is similar to the hitch free neutral mode, except the raise control valve 272 and the lower control valve 282 are in the respective closed positions. In the closed position, the raise control valve 272 limits (e.g., prevents) fluid from exiting the raise circuit 270. In the closed position, the lower control valve 282 limits (e.g., prevents) fluid from exiting the lower circuit 280 through the lower control valve 282. If the action select valve 290 is in the double-acting configuration, the plugged condition of the lower port 240 limits (e.g., prevents) fluid that bypasses the lower control valve 282 through the check valve 284 from exiting the lower circuit 280. Accordingly, the front hitch cylinders 120 are locked in place by the static fluid in the raise circuit 270 and the lower circuit 280.

Figure 9:
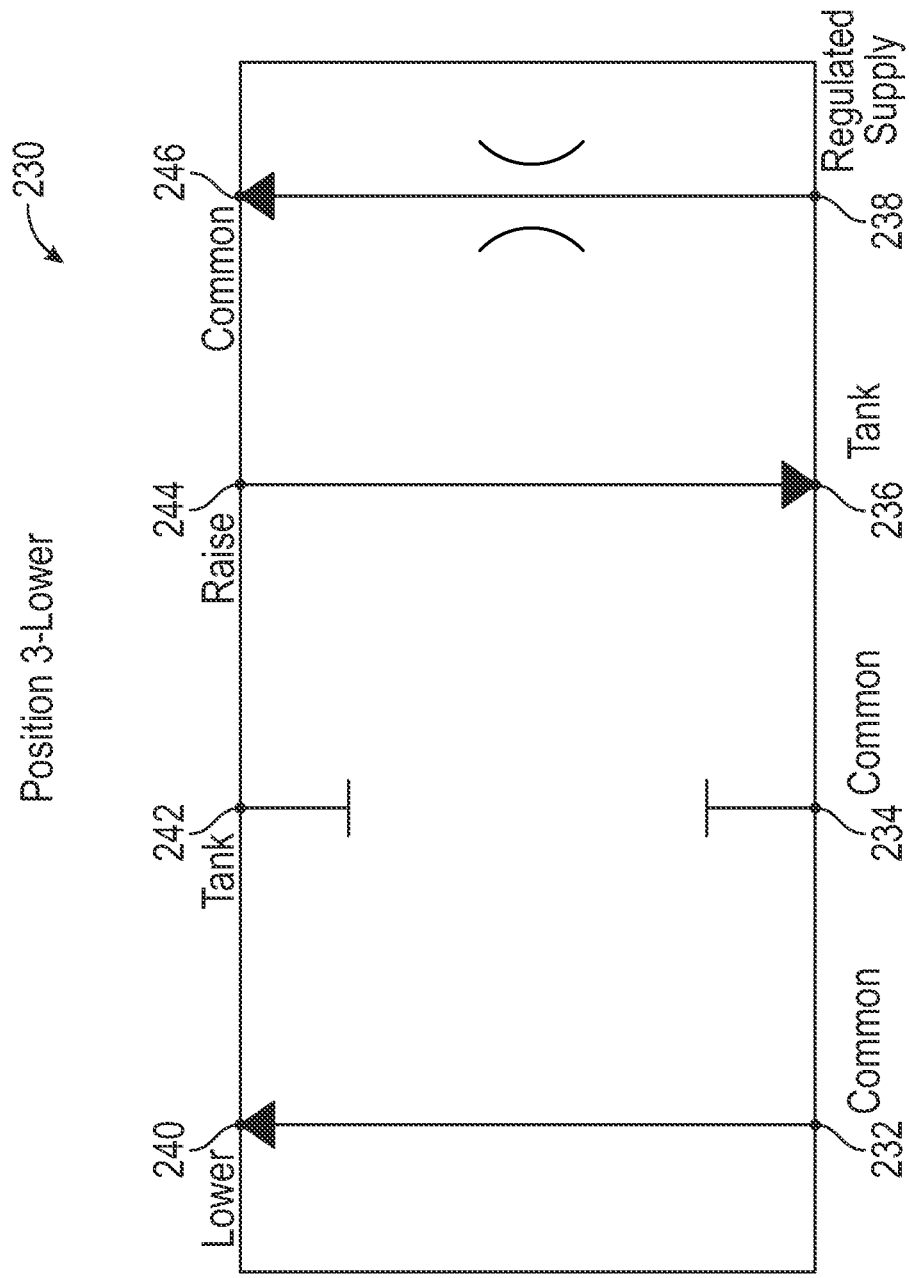
FIG. 9 is a schematic of the mode valve of FIG. 7 in a lower configuration, according to an exemplary embodiment.

Referring to FIGS. 6 and 9, in the lower mode, the front hitch 100 is lowered. In the lower mode, the mode valve 230 is in the third position (i.e., the position second from the right as shown in FIG. 6), and the raise control valve 272 and the lower control valve 282 are in the respective open positions. In the third position of the mode valve 230, the common port 234 and the tank port 242 are plugged. The raise port 244 is fluidly coupled to the tank port 236. Accordingly, the raise circuit 270 freely drains to the tank 204. The supply port 238 is fluidly coupled to the common port 246 through a flow-restricting orifice. The common port 232 is fluidly coupled to the lower port 240. Accordingly, pressurized fluid from the pressure control valve 210 flows through the supply port 238, the common port 246, the common port 232, and out through the lower port 240. If the action select valve 290 is in the single-acting position, the inlet 292 is plugged, preventing the fluid from entering the lower circuit 280, and the front hitch 100 lowers due to the force of gravity on the front hitch 100 and any corresponding attachments. If the action select valve 290 is in the double-acting position, the fluid from the lower port 240 passes through the action select valve 290 and the lower control valve 282 and enters the cap chambers 126, forcing the front hitch 100 downward.

Figure 10:
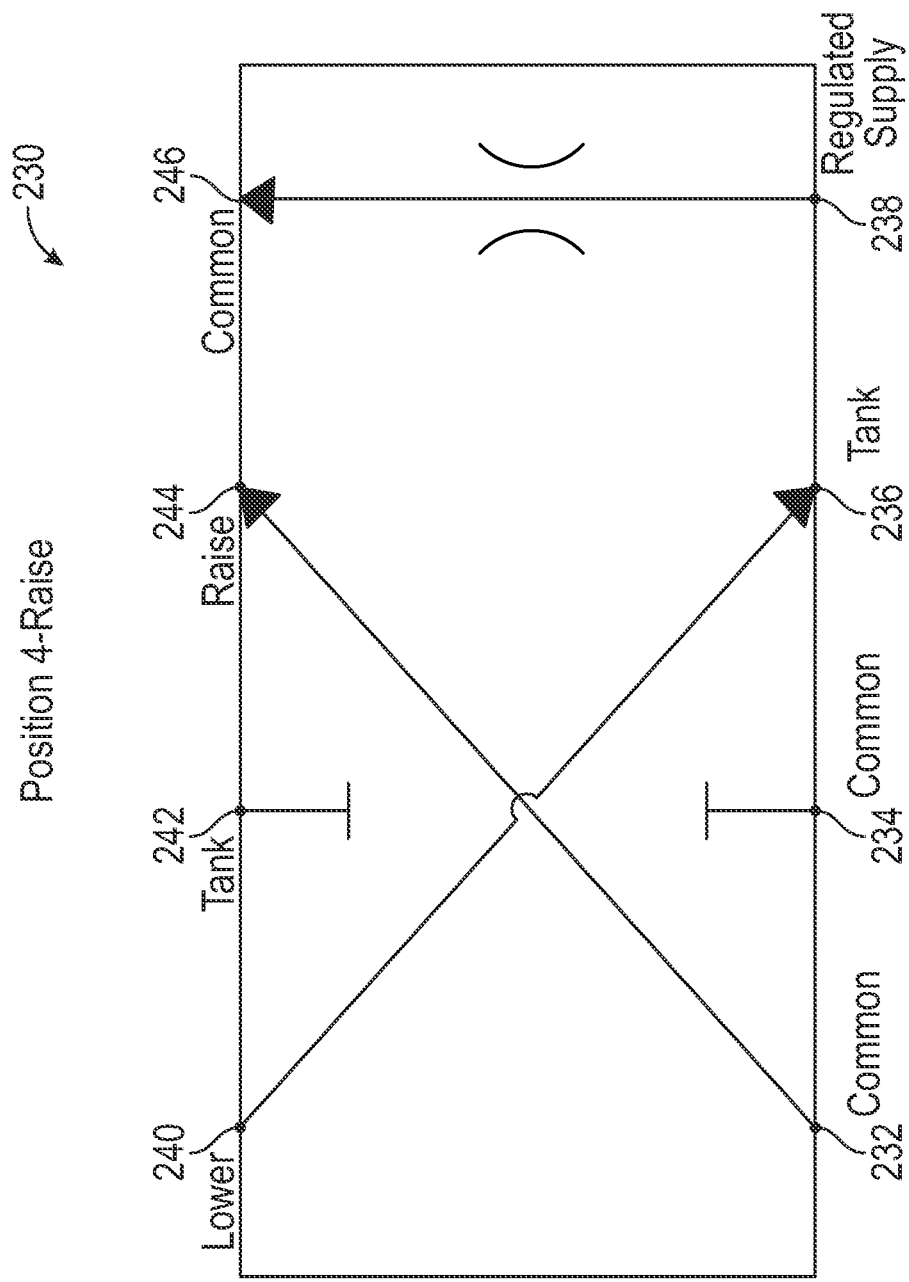
FIG. 10 is a schematic of the mode valve of FIG. 7 in a raise configuration, according to an exemplary embodiment.

Referring to FIGS. 6 and 10, in the raise mode, the front hitch 100 is raised. In the raise mode, the mode valve 230 is in the fourth position (i.e., the rightmost position of FIG. 6), and the raise control valve 272 and the lower control valve 282 are in the respective open positions. In the fourth position of the mode valve 230, the common port 234 and the tank port 242 are plugged. The lower port 240 is fluidly coupled to the tank port 236. If the action select valve 290 is in the double-acting configuration, the lower circuit 280 freely drains to the tank 204 through the mode valve 230. If the action select valve 290 is in the single-acting configuration, the lower circuit 280 freely drains to the tank 204 through the action select valve 290. The supply port 238 is fluidly coupled to the common port 246 through a flow-restricting orifice. The common port 232 is fluidly coupled to the raise port 244. Accordingly, pressurized fluid from the pressure control valve 210 flows through the supply port 238, the common port 246, the common port 232, and out through the raise port 244. The fluid from the raise port 244 passes through the raise control valve 272 and enters the rod chambers 128, forcing the front hitch 100 upward.

Rear Hitch—Hydraulic System

Figure 11:
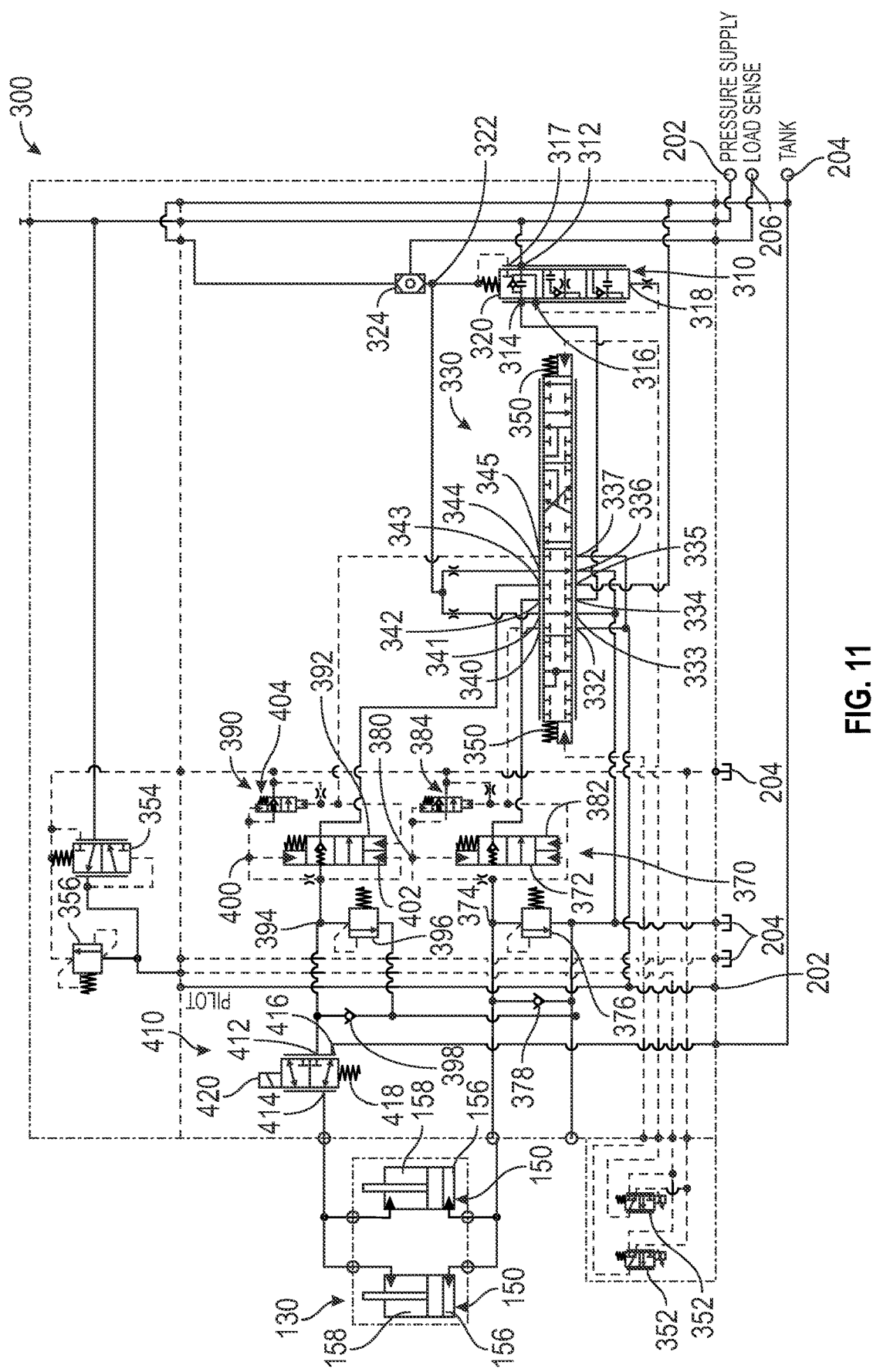
FIG. 11 is a schematic of a hydraulic circuit for controlling the rear hitch of FIG. 5, according to an exemplary embodiment.

Referring to FIG. 11, the vehicle 10 includes a fluid power system for the rear hitch 130, shown as hydraulic circuit 300. The hydraulic circuit 300 controls the flow of hydraulic fluid to and from a pair of rear hitch cylinders 150 to control raising and lowering of the rear hitch 130. Advantageously, the hydraulic circuit 300 may be selectively reconfigurable between a single-acting configuration and a double-acting configuration of the rear hitch 130. In a double-acting configuration, the hydraulic circuit 300 permits applying a positive downward force with the rear hitch 130. This may be advantageous when operating certain types of implements, such as blades, plows, sweepers, tillers, rakes, or rotary cutters, that benefit from a downward force (e.g., to more effectively engage the attachment with the ground). In a single-acting configuration, the rear hitch 130 may rely on gravity to move the attachment downward, but operation of the hydraulic circuit 300 may be more energy efficient (e.g., the hydraulic circuit 300 may require less energy to perform a given task). Accordingly, by permitting an operator to select between single-acting and double-acting operation, the hydraulic circuit 300 may permit efficiency and flexibility in operating the vehicle 10.

The hydraulic circuit 200 and the hydraulic circuit 300 may be sections of a common hydraulic system of the vehicle 10. The hydraulic circuit 300 may utilize the same pressure supply 202 and tank 204 as the hydraulic circuit 200. The hydraulic circuit 300 and the hydraulic circuit 200 may utilize the same load sense 206. In some embodiments, the load sense 206 of the hydraulic circuit 200 and the load sense 206 of the hydraulic circuit 300 are connected through a shuttle valve, such that the larger of the two pressures is supplied to control operation of a pump.

The hydraulic circuit 300 includes a directional control valve, shown as pressure control valve 310. The pressure control valve 310 is a three position, proportional directional control valve. The pressure control valve 310 includes a first port, shown as supply port 312, a second port, shown as outlet port 314, a third port, shown as sensing port 316, and a fourth port, shown as sensing port 317. The supply port 312 is fluidly coupled to the pressure supply 302. The outlet port 314 acts as an output of the pressure control valve 310. The sensing ports 316 and 317 provide pressure feedback that controls the pressure control valve 310.

In a first, end position (i.e., the uppermost position shown in FIG. 11), the supply port 312 is fluidly coupled to the sensing port 316, the supply port 312 is fluidly coupled to the outlet port 314 through a check valve, and the sensing port 317 is plugged. In a second, middle position (i.e., the middle position shown in FIG. 11), the supply port 312 is fluidly coupled to both the outlet port 314 and the sensing port 316 through a flow-restricting orifice, and the sensing port 317 is plugged. In a third, end position (i.e., the bottommost position shown in FIG. 11), the supply port 312 is plugged, the sensing port 316 is fluidly coupled to the outlet port 314, and the sensing port 317 is fluidly coupled to the outlet port 314 through a check valve.

A spool of the pressure control valve 310 is biased to the first position by a spring. Accordingly, the pressure control valve 310 is normally in the first position if no pressure is applied. The sensing port 316 is fluidly coupled to a first end 318 of the pressure control valve 310 through a flow-restricting orifice. Accordingly, as the pressure at the sensing port 316 increases, hydraulic fluid applies a force on the first end 318 to move the spool toward the third position. A second end 320 of the pressure control valve 310 is fluidly coupled to a load sense line, shown as common node 322, of the hydraulic circuit 300. Accordingly, as the pressure at the common node 322 increases, hydraulic fluid applies a force on the second end 320 to move the spool toward the first position.

In operation, the pressure control valve 310 is biased into the first position (i.e., in a closing direction) by the spring. In the first position, as pressure is applied at the supply port 312, the pressure control valve 310 directs the pressure to the first end 318, which moves the spool toward the third position (i.e., in an opening direction). In the first position and the second position, flow is directed from the supply port 312 to the outlet port 314. If the pressure at the first end 318 increases, and the spool moves from the second position toward the third position, the flow from the supply port 312 to the outlet port 314 is constricted, and the pressure at the first end 318 is vented to the outlet port 314. Accordingly, the pressure control valve 310 regulates the flow through the pressure control valve 310 and the pressure at the outlet port 314. The pressure at the common node 322 is applied at the second end 320 and biases the spool toward the third position. The sensing port 317 is fluidly coupled to the second end 320, such that in the third position fluid from the pressure control valve 310 may bias the spool toward the third position.

The common node 322 is fluidly coupled to the load sense 306 through a valve, shown as shuttle valve 324. The shuttle valve 324 has a first port that is fluidly coupled to the common node 322 and a second port opposite the first port. The shuttle valve 324 fluidly couples the load sense 306 to whichever of the first port and the second port has the greater pressure. The shuttle valve 324 may be used to compare two hydraulic pressures within the vehicle 10 and provide the larger of the two to the load sense 306. Additional shuttle valves may facilitate comparisons to other pressures within the vehicle 10.

Referring to FIGS. 11-15, the hydraulic circuit 300 includes a directional control valve, shown as mode valve 330. The mode valve 330 controls an operating mode of the hydraulic circuit 300. As shown, the mode valve 330 is a four position, proportional directional control valve, such that a spool of the mode valve 330 is repositionable between four positions. Each position of the mode valve 330 corresponds to a different operating mode of the hydraulic circuit 300. Specifically, the mode valve 330 has positions corresponding to a float mode, a neutral mode, a raise mode, and a lower mode. The position of the spool may be controlled to select a desired mode of operation of the hydraulic circuit 300.

The mode valve 330 has twelve total ports, six of which are positioned along a first side of the mode valve 330. A first port, shown as pilot port 332, is fluidly coupled to the pressure supply 202. A second port, shown as tank port 333, is fluidly coupled to the tank 204. A third port, shown as supply port 334, is fluidly coupled to the outlet port 314. The supply port 334 provides a supply of hydraulic fluid to the mode valve 330, the pressure of which is regulated by the pressure control valve 310. A fourth port, shown as tank port 335, and a fifth port, shown as tank port 336, are fluidly coupled to the tank 204. The tank port 333, the tank port 335, and the tank port 336 each provide a low-pressure sink to drain fluid from mode valve 330. A sixth port, shown as pilot port 337, is fluidly coupled to the pressure supply 202. The pilot port 332 and the pilot port 337 each provide the mode valve 330 with a supply of fluid at pilot pressure.

Six additional ports are positioned along a second side of the mode valve 330. A seventh port, shown as raise control port 340, provides a control pressure output to control operation of various valves that direct fluid to and from the cap chambers 156 of the rear hitch cylinders 150. Accordingly, the raise control port 340 controls raising of the rear hitch 130. An eighth port, shown as common port 341, is fluidly coupled to the common node through a flow-restricting orifice. A ninth port, shown as raise port 342, is positioned to direct fluid to and from the cap chambers 156 of the rear hitch cylinders 150. A tenth port, shown as lower port 343, is positioned to direct fluid to and from the rod chambers 158 of the rear hitch cylinders 150. An eleventh port, shown as common port 344, is fluidly coupled to the common node through a flow-restricting orifice. A twelfth port, shown as lower control port 345, provides a control pressure output to control operation of various valves that direct fluid to and from the rod chambers 158 of the rear hitch cylinders 150. Accordingly, the lower control port 345 controls lowering of the rear hitch 130.

The mode valve 330 includes a pair of springs 350 that bias the spool of the mode valve 330 in opposite directions. The hydraulic circuit 300 includes a pair of directional control valves, shown as pilot valves 352, that control the position of the spool of the mode valve 330. Specifically, the pilot valves 352 supply fluid to the ends of the spool of the mode valve 330 to actuate the mode valve 330.

The pilot valves 352 are supplied with fluid at a regulated pilot pressure by a pilot pressure control valve 354 and a relief valve 356. The pilot pressure control valve 354 is fluidly coupled to the pressure supply 202. The pilot pressure control valve 354 is a directional control valve that is spring-biased toward a first position, in which the pilot pressure control valve 354 fluidly couples the pressure supply 202 to the pilot valves 352. The pilot pressure control valve 354 is biased by the pressure downstream of the pilot pressure control valve 354 toward a second position. In the second position, the pilot pressure control valve 354 fluidly couples the pilot valves 352 to the tank 204. Accordingly, the pilot pressure control valve 354 sets the regulated pilot pressure at a target pressure. The relief valve 356 fluidly couples the pilot valves 352 to the tank 204 if the regulated pilot pressure exceeds a threshold relief pressure.

Each pilot valve 352 is fluidly coupled to a different end of the spool of the mode valve 330. Each pilot valve 352 has a first position or active position and a second position or inactive position. Each pilot valve 352 is actuated between the two positions by a solenoid. In the active position, the pilot valve 352 supplies the regulated pilot pressure to the corresponding end of the mode valve 330, biasing the spool in the opposite direction. In the inactive position, the pilot valve 352 fluidly couples the corresponding end of the mode valve 330 to the tank 204, eliminating the biasing force of the regulated pilot pressure. In operation, the position of the mode valve 330 may be controlled by activating or deactivating one or both of the pilot valves 352. Activating one of the pilot valves 352 forces the mode valve 330 in a predetermined direction, overcoming the biasing force of one of the springs 350. Activating both of the pilot valves 352 simultaneously may move the mode valve 330 toward a middle position (e.g., the second position or the third position).

The hydraulic circuit 300 further includes a first section, shown as raise circuit 370, that is fluidly coupled to the mode valve 330. The raise circuit 370 controls raising of the rear hitch 130. The raise circuit 370 includes a first directional control valve, shown as raise control valve 372, that is fluidly coupled to the raise port 342. As shown, the raise control valve 372 is fluidly coupled to the raise port 342. Downstream of the raise control valve 372 (i.e., between the raise control valve 372 and the rear hitch cylinders 150) is a point within the hydraulic circuit 300 shown as raise output node 374. The raise output node 374 is directly fluidly coupled to the cap chambers 156 and the raise control valve 372, such that the raise control valve 372 is directly fluidly coupled to the cap chambers 156. The raise control valve 372 controls the flow of fluid between the raise port 342 and the raise output node 374.

A valve, shown as relief valve 376, is fluidly coupled to the raise output node 374 and to the tank 204. If the pressure at the raise output node 374 exceeds a threshold pressure (e.g., a relief pressure) (e.g., 250 bar), the relief valve 376 fluidly couples the raise output node 374 to the tank 204 to drain the cap chambers 156. The relief valve 376 prevents damage to the hydraulic circuit 300 in the event that a large downward force is applied on the rear hitch 130.

A valve, shown as check valve 378, is fluidly coupled to the raise output node 374 and to the tank 204. If the pressure at the raise output node 374 becomes less than the pressure at the tank 204, the check valve 378 permits fluid to flow from the tank 204 into the cap chambers 156. The check valve 378 prevents the fluid within the cap chambers 156 from experiencing a negative pressure if the raise control valve 372 does not supply sufficient fluid to fill the cap chambers 156 (e.g., in the event that a large upward force is applied on the rear hitch 130 with the raise control valve 372 closed).

The raise control valve 372 is repositionable between a first configuration or closed position (i.e., the upper position shown in FIG. 11) and a second configuration or open position (i.e., the lower position shown in FIG. 11). In the closed position, the raise control valve 372 fluidly couples the raise port 342 to the raise output node 374 through a check valve, permitting fluid to flow only from the mode valve 330 to the cap chambers 156. In the open position, the raise control valve 372 fluidly couples the raise port 342 to the raise output node 374, permitting fluid to flow from the cap chambers 156 to the mode valve 330.

A spool of the raise control valve 372 is biased by a spring into the closed position. Accordingly, the raise control valve 372 is normally in the closed position if no pressure is applied (e.g., is a normally-closed valve). The spool of the raise control valve 372 is biased into the closed position by fluid pressure at a first end 380 of the spool. The first end 380 is fluidly coupled to the raise output node 374 through a flow-restricting orifice. The spool of the raise control valve 372 is biased into the open position by fluid pressure at a second end 382 of the spool. The second end 382 is directly fluidly coupled to the raise output node 374. The second end 382 is also directly fluidly coupled to the raise control port 340.

The hydraulic circuit 300 further includes a directional control valve, shown as raise actuation valve 384. The raise actuation valve 384 is repositionable between a first configuration or closed position (i.e., the upper position shown in FIG. 11) and a second configuration or open position (i.e., the lower position shown in FIG. 11). In the closed position, the raise actuation valve 384 fluidly couples the tank 204 to the first end 380 through a check valve, permitting fluid to flow only from the tank 204 to the first end 380 (i.e., blocking fluid from flowing from the first end 380 to the tank 204 through the raise actuation valve 384. In the open position, the raise actuation valve 384 fluidly couples the first end 380 to the tank 204, permitting fluid to flow drain from the first end 380 to the tank 204.

A spool of the raise actuation valve 384 is biased by a spring into the closed position. Accordingly, the raise actuation valve 384 is normally in the closed position if no pressure is applied (e.g., is a normally-closed valve). The spool of the raise actuation valve 384 is biased into the closed position by fluid pressure from the first end 380. The spool of the raise actuation valve 384 is biased into the open position by fluid pressure from the raise control port 340.

Figure 15:
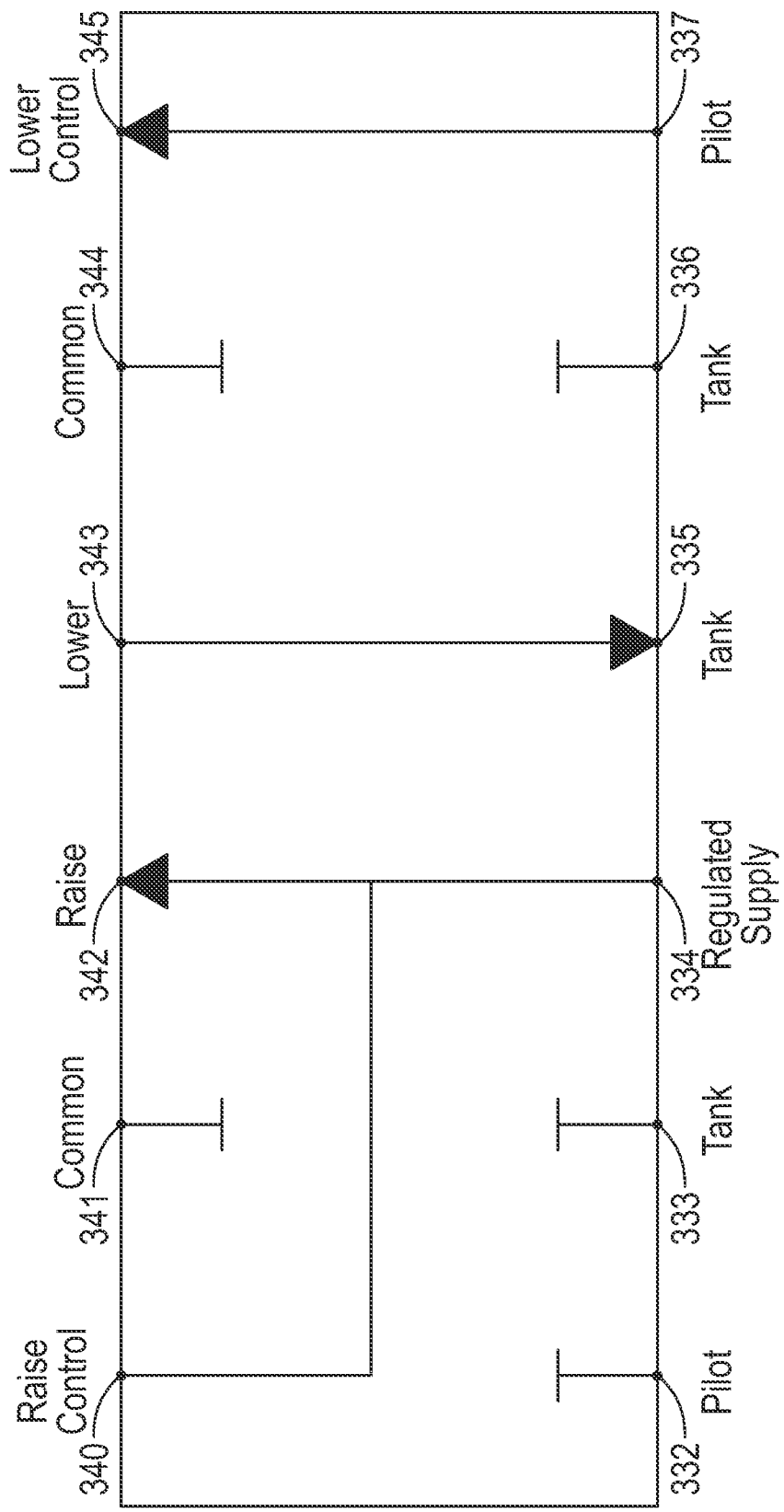
FIG. 15 is a schematic of the mode valve of FIG. 12 in a raise configuration, according to an exemplary embodiment.

To operate the raise circuit 370 to permit fluid to exit the cap chambers 156, the mode valve 330 fluidly couples the pressure supply 202 to the raise control port 340 (e.g., in the raise mode of FIG. 15). The pressurized fluid from the pressure supply 202 is supplied to the second end 382, biasing the raise control valve 372 to the open position. The pressurized fluid also forces the raise actuation valve 384 to the open position, draining fluid from the first end 380 to the tank 204. Accordingly, the raise control valve 372 moves to the open position and permits fluid to flow freely between the cap chambers 156 and the raise port 342 of the mode valve 330.

Figure 14:
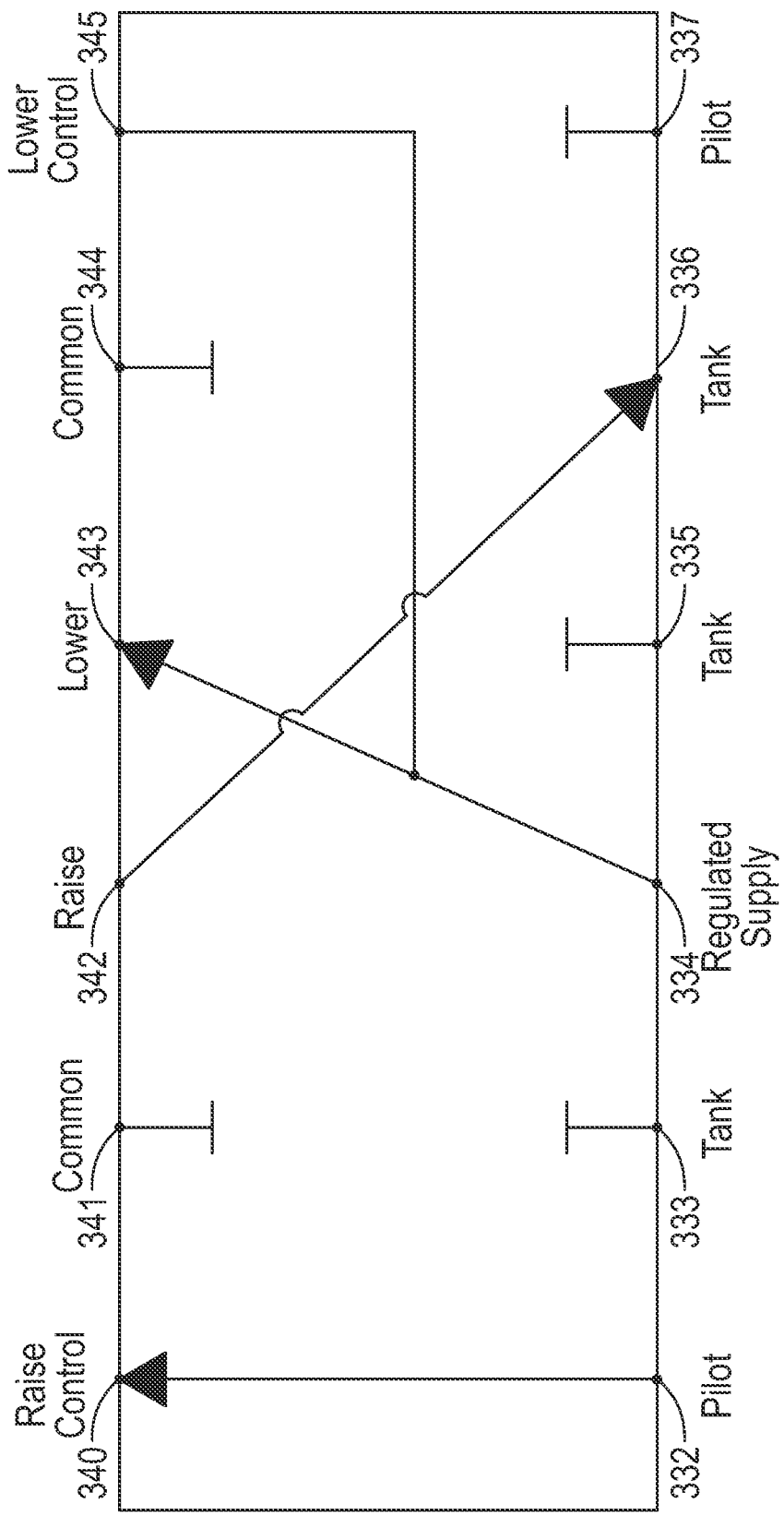
FIG. 14 is a schematic of the mode valve of FIG. 12 in a lower configuration, according to an exemplary embodiment.

To operate the raise circuit 370 to permit fluid only to enter the cap chambers 156, the mode valve 330 decouples the pressure supply 202 from the raise control port 340 (e.g., in the lower mode of FIG. 14). Any pressurized fluid at the raise control port 340 is permitted to drain to the tank 204 through a flow-restricting orifice. This permits the raise actuation valve 384 to return to the closed position and builds pressure at the first end 380. The fluid at the second end 382 drains to the tank 204. Accordingly, the raise control valve 372 moves to the closed position, and the check valve within the raise control valve 372 permits fluid to flow only from the raise port 342 of the mode valve 330 toward the cap chambers 156.

The hydraulic circuit 300 further includes a first section, shown as lower circuit 390, that is fluidly coupled to the mode valve 330. The lower circuit 390 controls lowering of the rear hitch 130. The lower circuit 390 includes a first directional control valve, shown as lower control valve 392, that is fluidly coupled to the lower port 343. As shown, the lower control valve 392 is fluidly coupled to the lower port 343. Downstream of the lower control valve 392 (i.e., between the lower control valve 392 and the rear hitch cylinders 150) is a point within the hydraulic circuit 300 shown as lower output node 394. The lower output node 394 is directly fluidly coupled to the rod chambers 158 and the lower control valve 392, such that the lower control valve 392 is directly fluidly coupled to the rod chambers 158. The lower control valve 392 controls the flow of fluid between the lower port 343 and the lower output node 394.

A valve, shown as relief valve 396, is fluidly coupled to the lower output node 394 and to the tank 204. If the pressure at the lower output node 394 exceeds a threshold pressure (e.g., a relief pressure) (e.g., 250 bar), the relief valve 396 fluidly couples the lower output node 394 to the tank 204 to drain the rod chambers 158. The relief valve 396 prevents damage to the hydraulic circuit 300 in the event that a upward force is applied on the rear hitch 130.

A valve, shown as check valve 398, is fluidly coupled to the lower output node 394 and to the tank 204. If the pressure at the lower output node 394 becomes less than the pressure at the tank 204, the check valve 398 permits fluid to flow from the tank 204 into the rod chambers 158. The check valve 398 prevents the fluid within the rod chambers 158 from experiencing a negative pressure if the lower control valve 392 does not supply sufficient fluid to fill the rod chambers 158 (e.g., in the event that a large downward force is applied on the rear hitch 130 with the lower control valve 392 closed).

The lower control valve 392 is repositionable between a first configuration or closed position (i.e., the upper position shown in FIG. 11) and a second configuration or open position (i.e., the lower position shown in FIG. 11). In the closed position, the lower control valve 392 fluidly couples the lower port 343 to the lower output node 394 through a check valve, permitting fluid to flow only from the mode valve 330 to the rod chambers 158. In the open position, the lower control valve 392 fluidly couples the lower port 343 to the lower output node 394, permitting fluid to flow from the rod chambers 158 to the mode valve 330.

A spool of the lower control valve 392 is biased by a spring into the closed position. Accordingly, the lower control valve 392 is normally in the closed position if no pressure is applied (e.g., is a normally-closed valve). The spool of the lower control valve 392 is biased into the closed position by fluid pressure at a first end 400 of the spool. The first end 400 is fluidly coupled to the lower output node 394 through a flow-restricting orifice. The spool of the lower control valve 392 is biased into the open position by fluid pressure at a second end 402 of the spool. The second end 402 is directly fluidly coupled to the lower output node 394. The second end 402 is also directly fluidly coupled to the lower control port 345.

The hydraulic circuit 300 further includes a directional control valve, shown as lower actuation valve 404. The lower actuation valve 404 is repositionable between a first configuration or closed position (i.e., the upper position shown in FIG. 11) and a second configuration or open position (i.e., the lower position shown in FIG. 11). In the closed position, the lower actuation valve 404 fluidly couples the tank 204 to the first end 400 through a check valve, permitting fluid to flow only from the tank 204 to the first end 400 (i.e., blocking fluid from flowing from the first end 400 to the tank 204 through the lower actuation valve 404. In the open position, the lower actuation valve 404 fluidly couples the first end 400 to the tank 204, permitting fluid to flow drain from the first end 400 to the tank 204.

A spool of the lower actuation valve 404 is biased by a spring into the closed position. Accordingly, the lower actuation valve 404 is normally in the closed position if no pressure is applied (e.g., is a normally-closed valve). The spool of the lower actuation valve 404 is biased into the closed position by fluid pressure from the first end 400. The spool of the lower actuation valve 404 is biased into the open position by fluid pressure from the lower control port 345.

To operate the lower circuit 390 to permit fluid to exit the rod chambers 158, the mode valve 330 fluidly couples the pressure supply 202 to the lower control port 345 (e.g., in the raise mode of FIG. 15). The pressurized fluid from the pressure supply 202 is supplied to the second end 402, biasing the lower control valve 392 to the open position. The pressurized fluid also forces the lower actuation valve 404 to the open position, draining fluid from the first end 400 to the tank 204. Accordingly, the lower control valve 392 moves to the open position and permits fluid to flow freely between the rod chambers 158 and the lower port 343 of the mode valve 330.

To operate the lower circuit 390 to permit fluid only to enter the rod chambers 158, the mode valve 330 decouples the pressure supply 202 from the lower control port 345 (e.g., in the lower mode of FIG. 14). Any pressurized fluid at the lower control port 345 is permitted to drain to the tank 204 through a flow-restricting orifice. This permits the lower actuation valve 404 to return to the closed position and builds pressure at the first end 400. The fluid at the second end 402 drains to the tank 204. Accordingly, the lower control valve 392 moves to the closed position, and the check valve within the lower control valve 392 permits fluid to flow only from the lower port 343 of the mode valve 330 toward the rod chambers 158.

The hydraulic circuit 300 includes a directional control valve or action control valve, shown as action select valve 410. The action select valve 410 is positioned to permit selection between single-acting and double-acting operation of the hydraulic circuit 300. The action select valve 410 includes a first port (e.g., an input/output port), shown as inlet 412, that is fluidly coupled to the lower output node 394. The action select valve 410 includes a second port (e.g., an input/output port), shown as outlet 414, that is fluidly coupled to the rod chambers 158. The action select valve 410 includes a third port, shown as tank port 416, that is fluidly coupled to the tank 204. Although the inlet 412 and the outlet 414 are referred to as an inlet and an outlet, respectively, it should be understood that the inlet 412 and the outlet 414 may each switch between acting as an inlet (e.g., where fluid flows into the action select valve 411 through the port) and an outlet (e.g., where fluid flows out of the action select valve 410 through the port), depending upon the operating conditions of the hydraulic circuit 300.

The action select valve 410 includes a spool that is repositionable between a first position or double-acting position (i.e., the uppermost position shown in FIG. 6) and a second position or single-acting position (i.e., the lowermost position shown in FIG. 6). In the double-acting position, the action select valve 410 fluidly couples the inlet 412 to the outlet 414 and plugs the tank port 416. In the single-acting position, the action select valve 410 fluidly couples the outlet 414 to the tank port 416 and plugs the inlet 412.

The action select valve 410 is a proportional solenoid valve. The action select valve 410 includes a spring 418 that biases the spool toward the single-acting position. Accordingly, the action select valve 410 is normally in the single-acting position. The action select valve 410 further includes a solenoid 420 that opposes the spring 418. When activated, the solenoid 420 overcomes the force of the spring 418 and moves the spool into the double-acting position.

The operating mode of the hydraulic circuit 300 can be selected by controlling the positions of the mode valve 330, the raise control valve 372, the lower control valve 392, and the action select valve 410. The mode valve 330 selects the primary flow directions of fluid throughout the hydraulic circuit 300. The raise control valve 372 selects whether or not fluid is permitted to pass between the mode valve 330 and the cap chambers 156. The lower control valve 392 selects whether or not fluid is permitted to pass from the mode valve 330 to the rod chambers 158. The action select valve 410 selects whether the rear hitch cylinders 150 are controlled in a single-acting configuration or a double-acting configuration. Table 2 below illustrates various operating modes of the hydraulic circuit 300. Although four operating modes are shown, each mode shown may have a single-acting configuration and a double-acting configuration. Accordingly, Table 2 may represent eight different operating modes. In other embodiments, the hydraulic circuit 300 has more or fewer potential operating modes.

TABLE 2

| Operating Mode | Mode Valve 330 | Raise Control Valve 372 | Lower Control Valve 392 |
| --- | --- | --- | --- |
| Float Mode | Position 1 (FIG. 12) | Open | Open |
| Neutral Mode | Position 2 (FIG. 13) | Closed | Closed |
| Lower Mode | Position 3 (FIG. 14) | Open | Open |
| Raise Mode | Position 4 (FIG. 15) | Open | Open |

Figure 12:
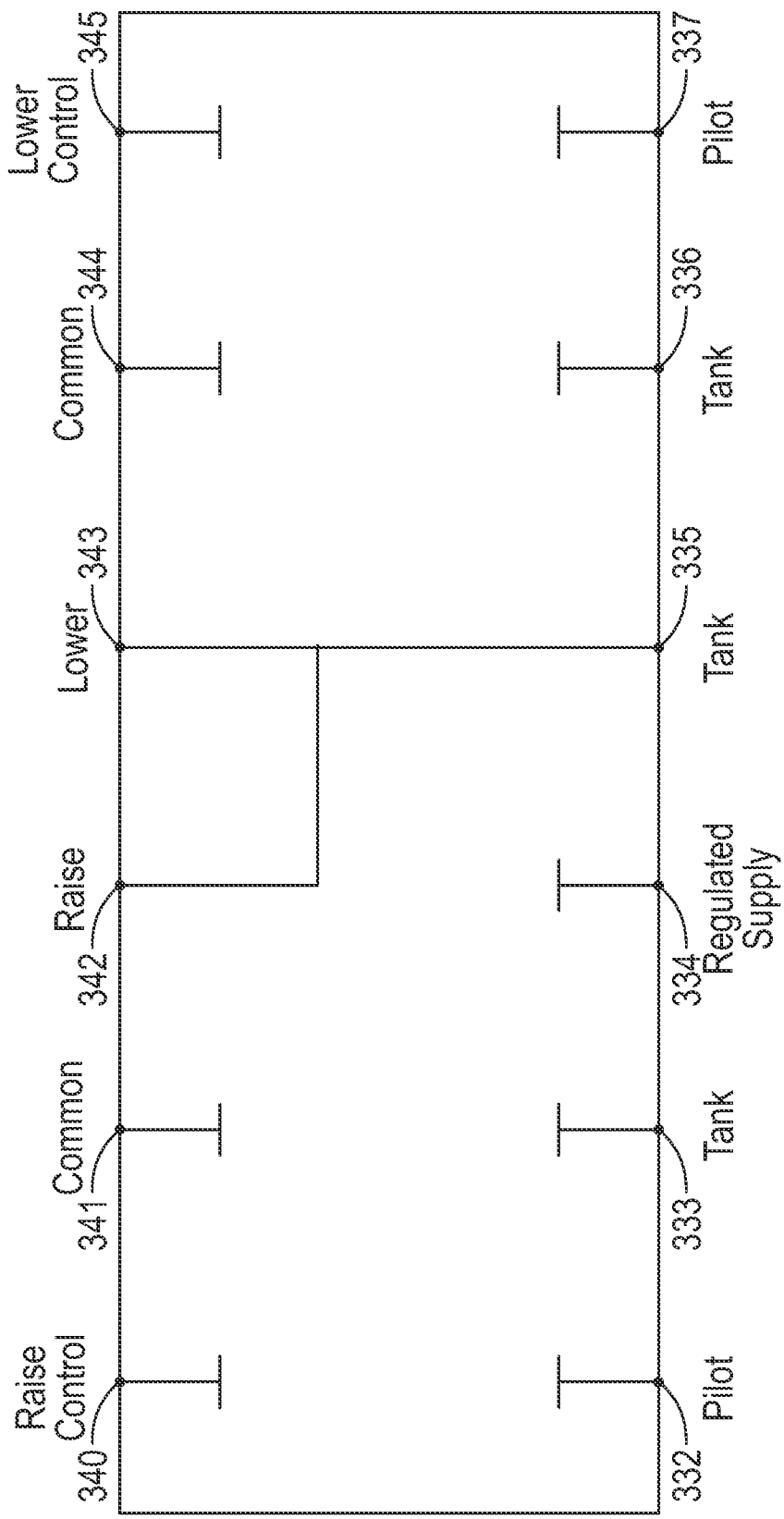
FIG. 12 is a schematic of a mode valve of the hydraulic circuit of FIG. 11 in a float configuration, according to an exemplary embodiment.

Referring to FIGS. 11 and 12, in a float mode, the hydraulic circuit 300 permits the rear hitch 130 to move freely (e.g., to a position desired by an operator, to a position driven by gravity, etc.). In the float mode, the mode valve 330 is in the first position (i.e., the leftmost position shown in FIG. 11), and the raise control valve 372 and the lower control valve 392 are in the respective open positions. The raise control valve 372 and the lower control valve 392 may be controlled to move to their respective open positions by the mode valve 330, or by sufficient downstream pressure building up to actuate the spools to the open positions. In the first position of the mode valve 330, the pilot ports 332 and 227, the tank ports 333 and 336, the supply port 334, the raise control port 340, the common ports 341 and 344, and the lower control port 346 are plugged. The raise port 342 and the lower port 343 are fluidly coupled to the tank port 335. If the action select valve 410 is in the double-acting configuration, fluid from the raise circuit 370 and the lower circuit 390 can be freely exchanged with one another through the mode valve 330 or drained to the tank 304, permitting the rear hitch 130 to move freely (e.g., to a position desired by an operator, to a position driven by gravity, etc.). If the action select valve 410 is in the single-acting configuration, fluid from the raise circuit 370 and the lower circuit 390 can be freely drained to the tank 304.

Figure 13:
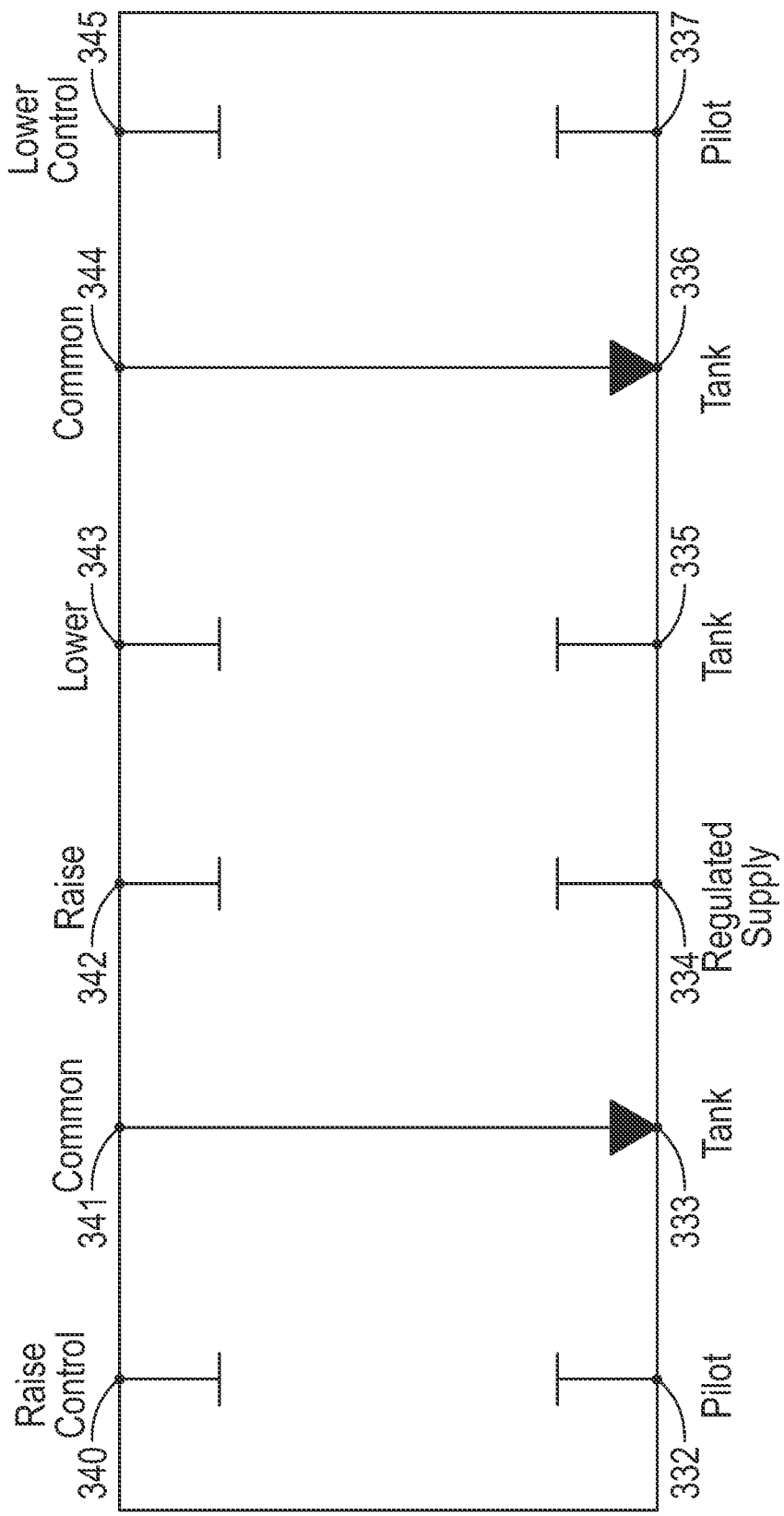
FIG. 13 is a schematic of the mode valve of FIG. 12 in a neutral configuration, according to an exemplary embodiment.

Referring to FIGS. 11 and 13, in the neutral mode, the raise circuit 370 and the lower circuit 390 are isolated, and the rear hitch 130 is held in place until a threshold force is applied. In the neutral mode, the mode valve 330 is in the second position (i.e., the position second from the left as shown in FIG. 11), and the raise control valve 372 and the lower control valve 392 are in the respective closed positions (e.g., due to the mode valve 330 not supplying fluid to the raise control port 340 and the lower control port 345). In the second position of the mode valve 330, the pilot ports 332 and 227, the supply port 334, the tank port 335, the raise control port 340, the raise port 342, the lower port 343, and the lower control port 346 are plugged. The common port 341 is fluidly coupled to the tank port 333. The common port 344 is fluidly coupled to the tank port 336. Accordingly, the common node 322 is permitted to flow to the tank 304 through the mode valve 330. As the raise port 342 is plugged, the raise circuit 370 is isolated. In this isolated condition, the rear hitch 130 can move upward if the check valve 378 supplies fluid from the tank 304 to the cap chambers 156, and the rear hitch 130 can move downward if the pressure in the cap chambers 156 is sufficient to activate the relief valve 376. With the lower port 343 plugged and the action select valve 410 in the double-acting configuration, the lower circuit 390 is isolated. In this isolated condition, the rear hitch 130 can move downward if the check valve 398 supplies fluid from the tank 304 to the rod chambers 158, and the rear hitch 130 can move upward if the pressure in the rod chambers 158 is sufficient to activate the relief valve 396. If the action select valve 410 is in the double-acting configuration, the lower circuit 390 is bypassed, and the rod chambers 158 can communicate directly with the tank 204.

Referring to FIGS. 11 and 14, in the lower mode, the rear hitch 130 is lowered. In the lower mode, the mode valve 330 is in the third position (i.e., the position second from the right as shown in FIG. 11), and the raise control valve 372 and the lower control valve 392 are in the respective open positions. In the third position of the mode valve 330, the tank ports 333 and 335, the pilot port 337, and the common ports 341 and 344 are plugged. The pilot port 332 is fluidly coupled to the raise control port 340, such that the pressure supply 202 supplies fluid to move the raise control valve 372 to the open position. The supply port 334 is fluidly coupled to the lower control port 345, such that pressurized fluid from the pressure control valve 310 is supplied to move the lower control valve 392 to the open position. The raise port 342 is fluidly coupled to the tank port 336. Accordingly, the raise circuit 370 freely drains to the tank 304. The supply port 338 is fluidly coupled to the lower port 343. Accordingly, pressurized fluid from the pressure control valve 310 is supplied to the lower circuit 390. If the action select valve 410 is in the single-acting position, the inlet 412 is plugged, preventing the fluid from the lower circuit 390 from passing into the rod chambers 158, and the rear hitch 130 lowers due to the force of gravity on the rear hitch 130 and any corresponding attachments. If the action select valve 410 is in the double-acting position, the fluid from the lower control valve 392 passes through the action select valve 410 and enters the rod chambers 158, forcing the rear hitch 130 downward. In an alternative embodiment, the lower control valve 392 is in the closed position while in the lower mode, and fluid is supplied through the check valve of the lower control valve 392.

Referring to FIGS. 11 and 15, in the raise mode, the rear hitch 130 is raised. In the raise mode, the mode valve 330 is in the fourth position (i.e., the rightmost position of FIG. 11), and the raise control valve 372 and the lower control valve 392 are in the respective open positions. In the fourth position of the mode valve 330, the pilot port 332, the tank ports 333 and 336, and the common ports 341 and 344 are plugged. The pilot port 337 is fluidly coupled to the lower control port 345, such that the pressure supply 202 supplies fluid to move the lower control valve 392 to the open position. The supply port 334 is fluidly coupled to the raise control port 340, such that pressurized fluid from the pressure control valve 310 is supplied to move the raise control valve 372 to the open position. The lower port 343 is fluidly coupled to the tank port 335. If the action select valve 410 is in the double-acting configuration, the lower circuit 390 and the rod chambers 158 freely drain to the tank 304 through the mode valve 330. If the action select valve 410 is in the single-acting configuration, the rod chambers 158 freely drain to the tank 304 through the action select valve 410. While in the single-acting configuration, the lower control valve 392 may alternatively be in the closed position, as the lower control valve 392 is bypassed by the action select valve 410. The supply port 334 is fluidly coupled to the raise port 342. Accordingly, pressurized fluid from the pressure control valve 310 is supplied to the cap chambers 156 through the raise circuit 370, forcing the rear hitch 130 upward. In an alternative embodiment, the raise control valve 372 is in the closed position while in the lower mode, and fluid is supplied through the check valve of the raise control valve 372.

Control System

Figure 16:
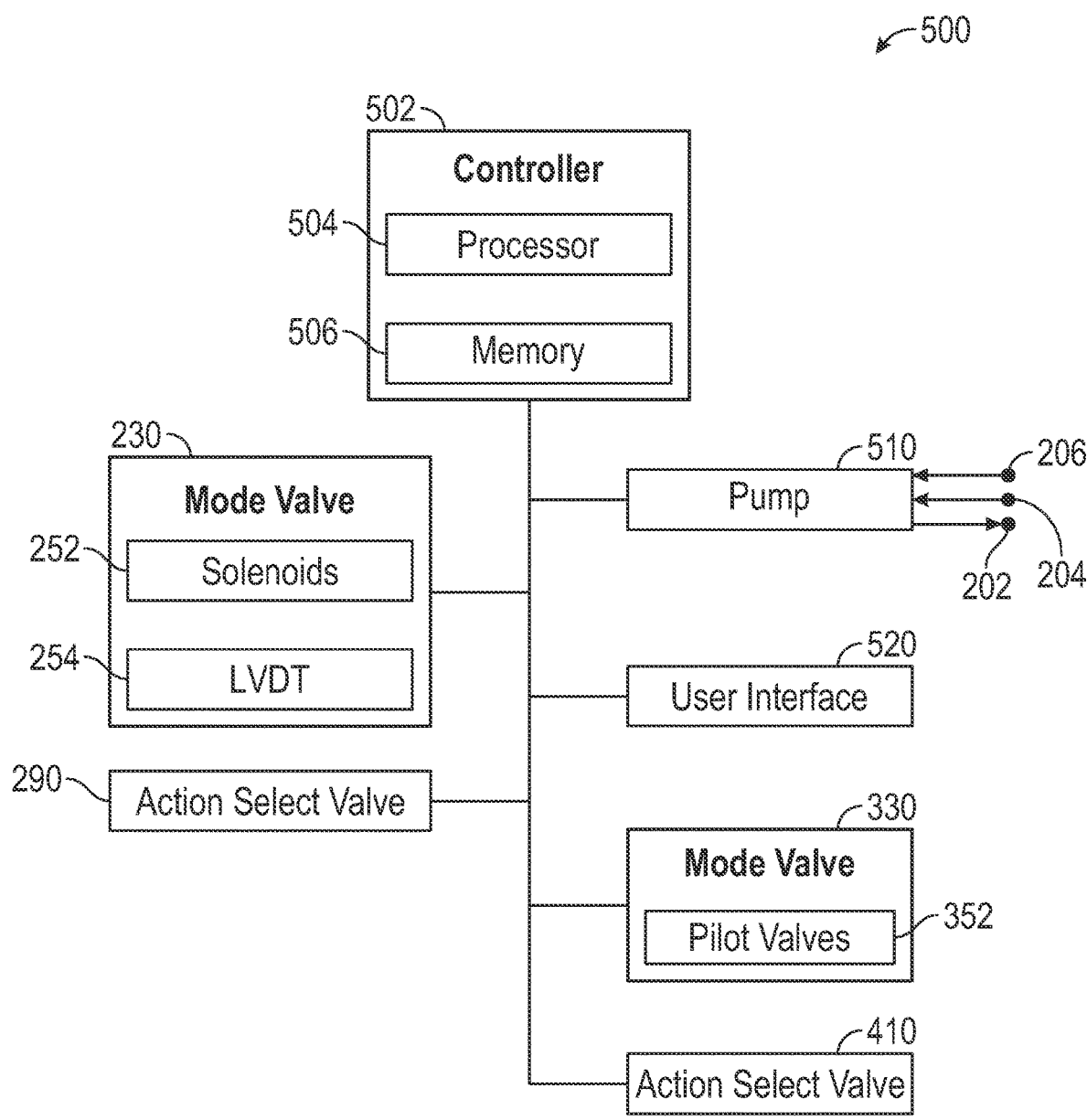
FIG. 16 is a block diagram of a control system of the vehicle of FIG. 1, according to an exemplary embodiment.

Referring to FIG. 16, the control system 500 is shown according to an exemplary embodiment. The control system 500 includes a processing circuit, shown as controller 502, that controls operation of the vehicle 10 (e.g., of the hydraulic circuit 200 and the hydraulic circuit 300). The controller 502 includes a processing device, shown as processor 504, and a memory device, shown as memory 506. The memory 506 may store one or more instructions that, when executed by the processor 504, cause the processor 504 to perform one or more of the processes described herein.

As shown, the controller 502 is operatively coupled to the mode valve 230 and the mode valve 330. Specifically, the controller 502 is operatively coupled to the solenoids 252, the LVDT 254, and the pilot valves 352. The controller 502 may provide control signals (e.g., electrical signals, etc.) to the solenoids 252 to control movement of the mode valve 230. The controller 502 may receive position data from the LVDT 254 and use the position data to provide closed-loop control over the position of the mode valve 230. The controller 502 may provide control signals to the pilot valves 352 to control movement of the mode valve 330.

As shown, the controller 502 is operatively coupled to the action select valve 290 and the action select valve 410. The controller 502 may provide control signals to control operation of the action select valve 290 and the action select valve 410. By way of example, the controller 502 may provide an electrical signal to the solenoid 299 to move the action select valve 290 to the single-acting position. By way of another example, the controller 502 may provide an electrical signal to the solenoid 420 to move the action select valve 410 to the double-acting position.

As shown, the controller 502 is operatively coupled to a pressure supply, shown as pump 510. The controller 502 may control operation of the pump 510 (e.g., by varying a displacement of the pump 510, by varying a speed of the pump 510, etc.). In some embodiments, the pump 510 is driven by the prime mover 52. The pump 510 may receive fluid at a low pressure from the tank 204 and supply pressurized fluid at the pressure supply 202. The pump 510 may receive pressure feedback from the load sense 206. In such embodiments, the pump 510 may be a load sense pump.

Referring still to FIG. 16, the control system 500 includes an input/output device, shown as user interface 520. The user interface 520 may facilitate communication between the controller 502 and a user or operator (e.g., by communicating information to the user, by receiving commands from the user, etc.). The user interface 520 may include one or more input devices (e.g., a touchscreen, buttons, switches, knobs, microphones, etc.) that receive inputs (e.g., commands) from a user. The user interface 520 may include one or more output devices (e.g., displays, speakers, haptic feedback vibrators, etc.) that provide information to the user.

In operation, the controller 502 may control operation of the hydraulic circuit 200 and the hydraulic circuit 300 based on inputs from the user through the user interface 520. By way of example, a user may select one or more modes of operation of the vehicle 10 through the user interface 520. The user may select between the float mode, the neutral mode, the raise mode, and the lower mode for the front hitch 100 and/or the rear hitch 130. The user may also select between a single-acting mode and a double-acting mode for the front hitch 100 and/or the rear hitch 130. Based on the user selections, the controller 502 may operate the mode valve 230, the action select valve 290, the mode valve 330, and/or the action select valve 410 to reconfigure the hydraulic circuit 200 and/or the hydraulic circuit 300 into the selected mode or modes.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 500, etc.) as shown in the various exemplary embodiments is illustrative only. Additionally, any element disclosed in one embodiment may be incorporated or utilized with any other embodiment disclosed herein.

What is claimed is:

1. A vehicle comprising:
   a frame;
   a hitch coupled to the frame;
   a cylinder positioned to move the hitch relative to the frame, the cylinder having a first chamber and a second chamber; and
   a fluid system fluidly coupled to the cylinder, the fluid system including an action select valve reconfigurable between a single-acting configuration and a double-acting configuration,
   wherein the fluid system is configured to supply a fluid to the first chamber to raise the hitch;
   wherein, when the action select valve is in the double-acting configuration, the fluid system controls the cylinder to lower the hitch by draining the fluid from the first chamber and supplying the fluid to the second chamber; and
   wherein, when the action select valve is in the single-acting configuration, the fluid system controls the cylinder to lower the hitch by draining the fluid from the first chamber without supplying the fluid to the second chamber.

2. The vehicle of claim 1, wherein the fluid system further includes:
   a pressure supply configured to supply the fluid;
   a mode valve reconfigurable between a raise configuration and a lower configuration,
   wherein, when the mode valve is in the lower configuration, the mode valve directs the fluid from the pressure supply to the action select valve.

3. The vehicle of claim 2, wherein, when the mode valve is in the raise configuration, the mode valve directs the fluid from the pressure supply to the first chamber.

4. The vehicle of claim 3, wherein, when the mode valve is in the lower configuration, the mode valve drains the fluid from the first chamber; and
   wherein, when the mode valve is in the raise configuration, the mode valve drains the fluid from the action select valve.

5. The vehicle of claim 4, wherein the action select valve fluidly decouples the second chamber from the mode valve when the action select valve is in the single-acting configuration.

6. The vehicle of claim 3, wherein the mode valve is further reconfigurable into a float configuration in which the mode valve fluidly couples the first chamber and the second chamber to a low-pressure return.

7. The vehicle of claim 3, wherein the mode valve is further reconfigurable into a neutral configuration in which the mode valve both (a) prevents flow from the first chamber through the mode valve and (b) prevents flow from the second chamber through the mode valve.

8. The vehicle of claim 3, further comprising:
   a user interface; and
   a controller operatively coupled to the action select valve, the mode valve, and the user interface, wherein the controller is configured to reconfigure the action select valve and the mode valve in response to at least one user input through the user interface.

9. The vehicle of claim 1, wherein when the action select valve is in the single-acting configuration, the action select valve fluidly couples the second chamber to a low-pressure return.

10. The vehicle of claim 1, wherein the fluid system further includes:
    a pump configured to supply the fluid;
    a load sense line configured to supply pressure feedback from the fluid system to control operation of the pump; and
    a mode valve that is reconfigurable between a first configuration and a second configuration,
    wherein, in the first configuration, the mode valve directs the fluid from the pump to at least one of the first chamber and the second chamber; and
    wherein, in the second configuration, the mode valve directs the fluid from the load sense line to a low-pressure return.

11. The vehicle of claim 1, wherein the hitch is a front hitch positioned adjacent a front end of the frame and configured to couple an attachment to the front end of the frame.

12. The vehicle of claim 11, further comprising a lower control valve fluidly coupled to the action select valve and the second chamber, wherein the lower control valve is configured to selectively fluidly couple the action select valve to the second chamber, and wherein the lower control valve is configured to be manually operated by an operator.

13. The vehicle of claim 1, wherein the hitch is a rear hitch positioned adjacent a rear end of the frame and configured to couple an attachment to the rear end of the frame.

14. The vehicle of claim 11, further comprising:
    a lower control valve fluidly coupled to the action select valve and configured to control a flow of a first portion of the fluid through the action select valve; and
    a mode valve configured to (a) selectively supply the first portion of the fluid to the lower control valve and (b) selectively supply a second portion of the fluid to control operation of the lower control valve.

15. The vehicle of claim 1, wherein the cylinder is a first cylinder, further comprising a second cylinder positioned to move the hitch relative to the frame, the second cylinder having a third chamber fluidly coupled to the first chamber of the first cylinder and a fourth chamber fluidly coupled to the second chamber of the first cylinder.

16. A vehicle comprising:
    a frame;
    a first hitch coupled to a first end of the frame;
    a first cylinder positioned to move the first hitch relative to the frame, the first cylinder having a first chamber that increases in volume when the first hitch is lowered;
    a second hitch coupled to a second end of the frame opposite the first end;
    a second cylinder positioned to move the second hitch relative to the frame, the second cylinder having a second chamber that increases in volume when the second hitch is lowered; and
    a fluid system fluidly coupled to the first cylinder and the second cylinder, the fluid system including:

a first action select valve reconfigurable between (a) a single-acting configuration in which the first action select valve drains a fluid from the first chamber to a low-pressure return while the first hitch is lowered and (b) a double-acting configuration in which the first action select valve supplies the fluid to the first chamber while the first hitch is lowered; and a second action select valve reconfigurable between (a) a single-acting configuration in which the second action select valve drains the fluid from the second chamber to the low-pressure return while the second hitch is lowered and (b) a double-acting configuration in which the second action select valve supplies the fluid to the second chamber while the second hitch is lowered.

17. The vehicle of claim 16, wherein the fluid system further includes a mode valve reconfigurable between (a) a lower configuration in which the mode valve fluidly couples the first action select valve to a pressure supply and (b) a raise configuration in which the mode valve fluidly couples the first action select valve to the low-pressure return.

18. The vehicle of claim 17, wherein the mode valve is a first mode valve, and wherein the fluid system further includes a second mode valve reconfigurable between (a) a lower configuration in which the second mode valve fluidly couples the second action select valve to the pressure supply and (b) a raise configuration in which the second mode valve fluidly couples the second action select valve to the low-pressure return.

19. The vehicle of claim 16, wherein the first end of the frame is a front end of the frame and the second end of the frame is a rear end of the frame.

20. A vehicle comprising:
a frame;
a hitch coupled to the frame;
a cylinder positioned to move the hitch relative to the frame, the cylinder having a first chamber and a second chamber;
a fluid system fluidly coupled to the cylinder, the fluid system including:
   a pressure supply;
   a low-pressure return;
   an action select valve including a port, wherein in a double-acting configuration, the action select valve fluidly couples the second chamber to the port, and wherein in a single-acting configuration, the action select valve fluidly couples the second chamber to the low-pressure return; and
   a mode valve reconfigurable between a raise configuration and a lower configuration,
   wherein in the raise configuration, the mode valve (a) fluidly couples the pressure supply to the port and (b) fluidly couples the first chamber to the low-pressure return; and
   wherein in the lower configuration, the mode valve (a) fluidly couples the port to the low-pressure return and (b) fluidly couples the pressure supply to the first chamber.

* * * * *